US012560276B2

(12) United States Patent
Nishita et al.

(10) Patent No.: US 12,560,276 B2
(45) Date of Patent: Feb. 24, 2026

(54) TARGET SUPPORT TOOL

(71) Applicant: TOPCON CORPORATION, Tokyo (JP)

(72) Inventors: Nobuyuki Nishita, Tokyo (JP); Toshio Yamada, Tokyo (JP); Kunpei Komagamine, Tokyo (JP); Noriyasu Kiryuu, Tokyo (JP); Ryosuke Jinnouchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 679 days.

(21) Appl. No.: 17/935,895

(22) Filed: Sep. 27, 2022

(65) Prior Publication Data

US 2023/0100796 A1 Mar. 30, 2023

(30) Foreign Application Priority Data

Sep. 28, 2021 (JP) ................................. 2021-157527

(51) Int. Cl.
F16M 13/02 (2006.01)
F16B 1/00 (2006.01)
G02B 5/12 (2006.01)

(52) U.S. Cl.
CPC .............. F16M 13/02 (2013.01); F16B 1/00 (2013.01); F16B 2200/83 (2023.08); G02B 5/12 (2013.01)

(58) Field of Classification Search
CPC ....... F16M 13/02; F16B 1/00; F16B 2200/83; G02B 5/12
See application file for complete search history.

(56) References Cited

U.S. PATENT DOCUMENTS

| | | | | |
|---|---|---|---|---|
| 3,057,250 | A | 10/1962 | Griffith | |
| 3,814,500 | A * | 6/1974 | Ebenbichler | E01F 9/619 |
| | | | | 359/547 |
| 4,168,578 | A * | 9/1979 | VanderWerf | G01C 9/28 |
| | | | | 33/382 |
| 5,207,004 | A * | 5/1993 | Gruetzmacher | G01C 9/28 |
| | | | | 33/379 |
| 5,255,443 | A * | 10/1993 | Schmidt | G01C 9/28 |
| | | | | 33/379 |
| 5,524,353 | A * | 6/1996 | Fink | G01C 9/28 |
| | | | | 33/456 |

(Continued)

FOREIGN PATENT DOCUMENTS

| | | |
|---|---|---|
| CN | 102213600 A | 10/2011 |
| CN | 212692788 U | 3/2021 |

(Continued)

OTHER PUBLICATIONS

Notice of Reasons for Refusal mailed Jun. 24, 2025, in connection with Japanese Patent Application No. 2021-157527, 6 pgs. (including translation).

(Continued)

*Primary Examiner* — Monica E Millner
(74) *Attorney, Agent, or Firm* — Chiesa Shahinian & Giantomasi PC

(57) ABSTRACT

A target support tool includes: a base member including a first arm and a second arm connectable to each other to form a bent therebetween; a magnetic support part at least on the first arm; and a retroreflector at the bent of the base member.

10 Claims, 22 Drawing Sheets

(56) References Cited

U.S. PATENT DOCUMENTS

| | | | | |
|---|---|---|---|---|
| 5,950,992 | A * | 9/1999 | Weid | E01F 9/669 |
| | | | | 256/66 |
| 6,052,911 | A | 4/2000 | Davis | |
| 7,000,328 | B1 | 2/2006 | Iliff | |
| 7,059,059 | B1 * | 6/2006 | Ames | G01C 9/28 |
| | | | | 33/372 |
| 7,254,895 | B1 * | 8/2007 | O'Donnell | B25B 5/04 |
| | | | | 248/231.51 |
| 7,611,105 | B1 | 11/2009 | Carazo | |
| 7,669,342 | B1 * | 3/2010 | Crain | G01C 9/28 |
| | | | | 33/372 |
| 8,209,874 | B1 | 7/2012 | Tribble et al. | |
| 8,534,952 | B2 * | 9/2013 | Vladislavic | E01F 15/0423 |
| | | | | 404/9 |
| 9,181,725 | B2 * | 11/2015 | Roddy | F16L 3/12 |
| 2003/0066198 | A1 | 4/2003 | Turner | |
| 2008/0123110 | A1 | 5/2008 | Dickinson et al. | |
| 2010/0243833 | A1 * | 9/2010 | Kane, Jr. | G01C 15/004 |
| | | | | 248/206.5 |

FOREIGN PATENT DOCUMENTS

| | | | |
|---|---|---|---|
| JP | H330805 | U | 3/1991 |
| JP | H10332336 | A | 12/1998 |
| JP | H11210354 | A | 8/1999 |
| JP | 2007192612 | A | 8/2007 |
| JP | H5075613 | B2 | 11/2012 |
| JP | 2015108594 | A | 6/2015 |
| JP | H6030713 | B1 | 11/2016 |
| JP | 2019-039274 | A | 3/2019 |
| JP | H7091953 | B2 | 6/2022 |

OTHER PUBLICATIONS

Extended European Search Report mailed Feb. 20, 2023, in connection with European Patent Application No. 22197881, 9 pgs.
Notice of Reasons for Refusal mailed Dec. 12, 2025, in connection with Japanese Patent Application No. 2021-157527, 8 pgs. (including translation).

* cited by examiner

FIG.4

TARGET SUPPORT TOOL

BACKGROUND

The present disclosure relates to a target support tool, which might be used in construction sites of buildings where steel columns are built.

A structure construction requires erection adjustment work of column members or pillar members such as steel columns after the column members or pillar members are roughly assembled and erected. The erection adjustment work adjusts column members or pillar members, so that they become upright and untilted to the horizontal plane. Regarding measuring the uprightness or tilting of column members, one of the techniques is disclosed in Japanese Unexamined Patent Publication No. 2019-39274, describing a system to measure the position of a pillar member by attaching a retroreflective member on the pillar and utilizing a surveying apparatus. This technique determines a tilt amount of the column member by measuring the position of the retroreflective member with the surveying apparatus.

SUMMARY

Such a retroreflective member is assumed to be attached to targets (such as pillars) in various shapes or designs. Therefore, for attaching such a retroreflective member, different support tools are adopted in accordance with the shapes or locations of the attachment targets. This requires cumbersome management or placement works for using different support tools for various targets.

In view of the forgoing issues described, an object of the present disclosure is to provide a highly convenient target support tool.

In order to achieve the object, a target support tool according to the present disclosure includes: a base member including a first arm and a second arm connectable to each other to form a bent therebetween; a magnetic support part at least on the first arm; and a retroreflector at the bent of the base member.

The present disclosure provides a highly convenient target support tool.

BRIEF DESCRIPTION OF THE DRAWINGS

FIG. 4 is a plan view of the target support tool according to the first embodiment as viewed from above.

DETAILED DESCRIPTION

First Embodiment

Figure 1:
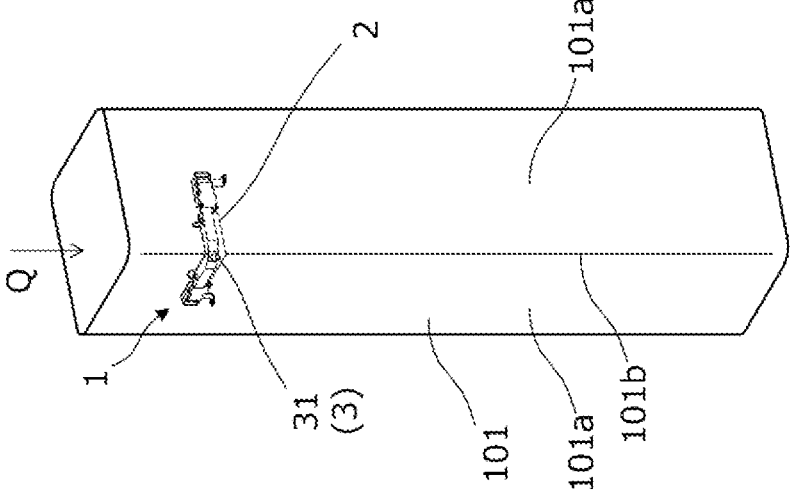
FIG. 1 illustrates an example use case of a target support tool according to a first embodiment of the present disclosure.
Figure 1:
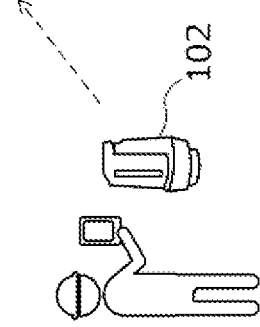

A first embodiment of the present disclosure is described below with reference to the drawings. A target support tool 1 illustrated in FIG. 1 can support a retroreflector 31 that is a measurement target (target) usable for measuring or surveying the shape of spaces, which may be the shape of structures. The target support tool 1 can be used to acquire the position (spatial coordinates) of a structure as follows. The target support tool 1 is attached to an attachment target 101. The attachment target 101 may be a columnar object (e.g., a steel frame) at a construction site or a corner (e.g., a projected corner or a recessed corner) between inner walls in an indoor space. The target support tool 1 attached to the attachment target 101 is then measured using a surveying device 102, such as a total station. In this Description, the term "projected corner" refers to a corner, which is formed by two walls placed together to project out, and which may be referred to as an external corner in general, and the term "recessed corner" refers to a corner, which is formed by two walls placed together to recess in, and which may be referred to as internal corner in general.

Figure 2:
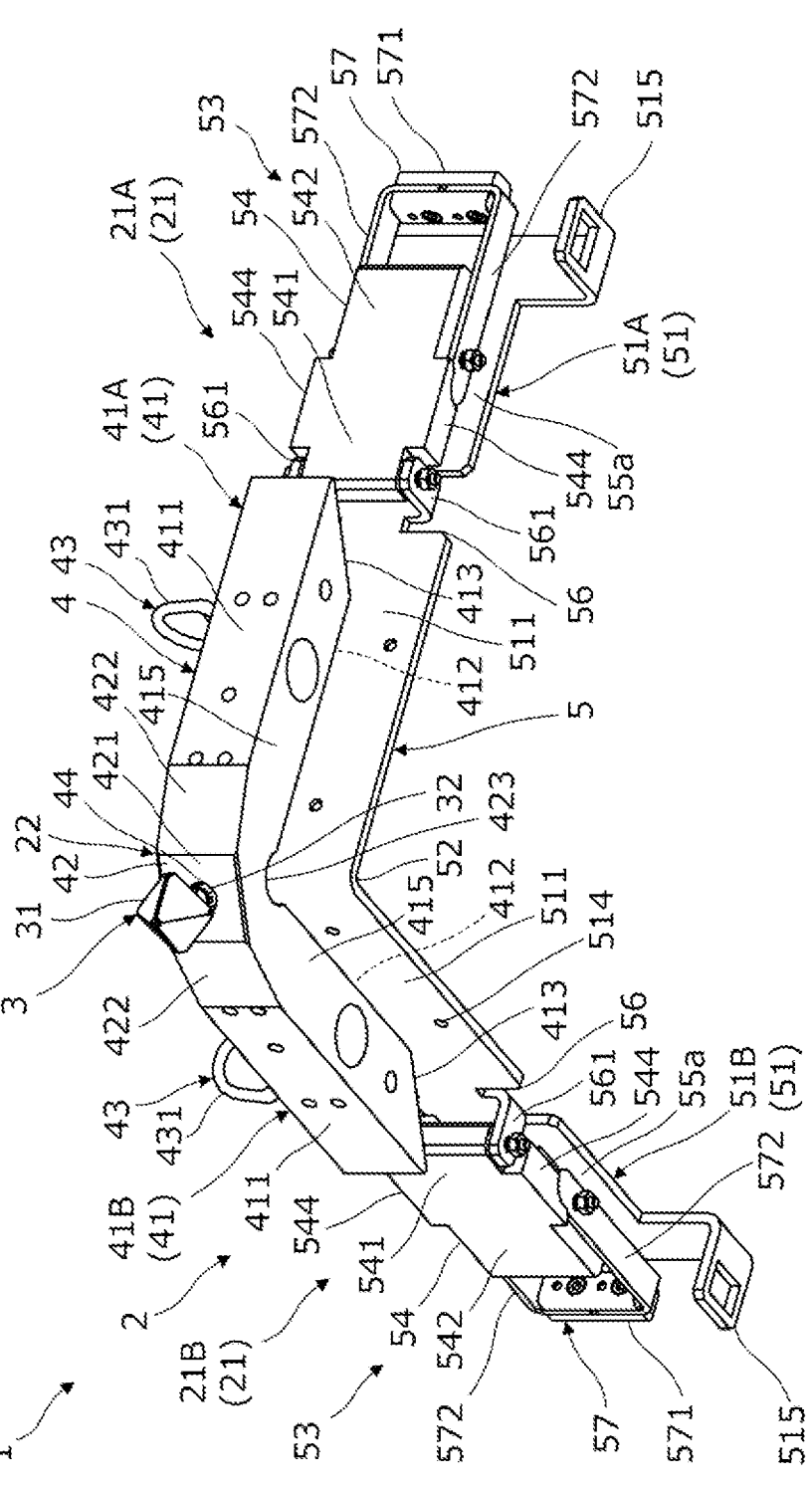
FIG. 2 is a perspective view of the target support tool according to the first embodiment as viewed from the lower front.
Figure 3:
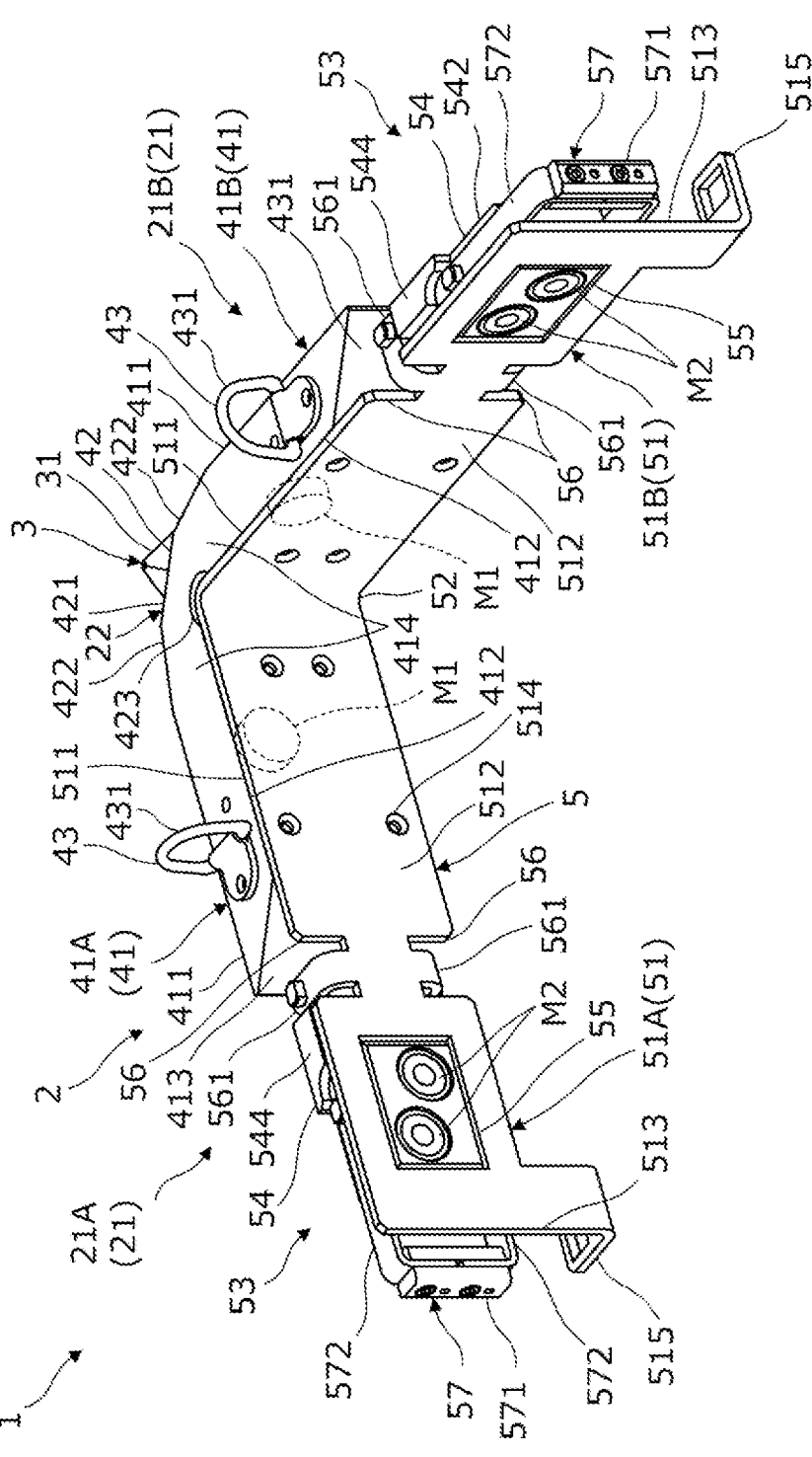
FIG. 3 is a perspective view of the target support tool according to the first embodiment as viewed from the upper back.

The target support tool 1 illustrated in FIGS. 2 and 3 includes a base member 2 and a retroreflective member 3. The base member 2 includes a first arm 21A (21) and a second arm 21B (21) connectable to each other to form a bent 22 therebetween. The retroreflective member 3 is placed at the outside corner of the bent 22 of the base member 2. The first and second arms 21A and 21B are connectable to form a right angle at the bent 22. Here, the base member 2 illustrated is substantially in an L-shape as a whole in a plan view (see FIG. 4). In the target support tool 1 according to the first embodiment and target support tools 1*a* to 1*c* in other examples, which will be described later, the first and second arms 21A and 21B (first arms 41A and 51A and second arms 41B and 51B as well) are connectable to form a right angle (in other words, connectable to form a right angle).

The base member 2 includes a first base body 4 and a second base body 5. The first base body 4 is provided with the retroreflective member 3. The second base body 5 includes magnets M2. The magnets M2 serve as magnetic support parts to allow an attachment target to attach and detach from and to themselves. The first base body 4 can be detachably fixed to the second base bodies 5 in such a way that the outside corner of a bent 52 (22) of the second base body 5 faces the inside corner of the first base body 4. The first base body 4 is also detachably fixed to the second base body 5 (which is a magnetic body such as a metal) using magnets (i.e., magnetic support parts) M1 placed on one surfaces of the first and second arms 41A and 41B of the first base body 4. The one surfaces of the first and second arms 41A and 41B may be inner surfaces 412 forming the inside corner of a bent 42 (22) as in this embodiment.

Figure 4:
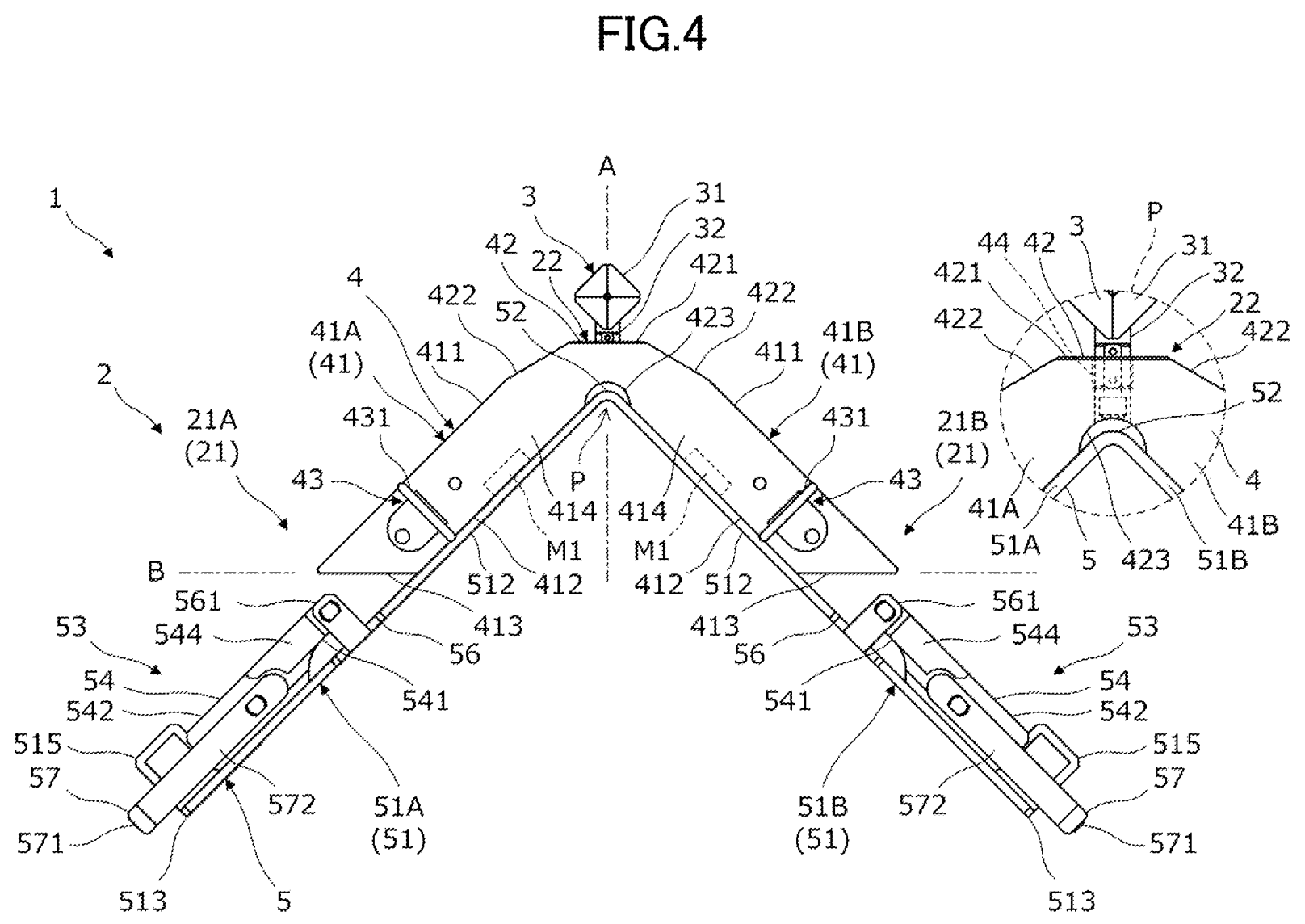

The first base body 4 includes the first and second arms 41A (41) and 41B (41) connected to form a right angle at the bent 42, so as to form a substantially L-shape as a whole. As illustrated in FIG. 4, the first and second arms 41A and 41B according to this embodiment are symmetric in shapes and geometries with respect to the axis A of symmetry, which passes through the bent 42. The first and second arms 41A and 41B each have a quadrangular prism shape, which has a substantially square cross-section. The bent 42 has outer surfaces 411, which form the outside corner. The outer surfaces 411 include an inner slope 421 and outer slopes 422, respectively. The inner slope 421 is located on the axis A of symmetry in the plan view (see FIG. 4) and forms a flat surface tilting at 45 degrees from the outer surfaces 411 of the first and second arms 41A and 41B, respectively. On the other hand, each outer slope 422 is interposed between the inner slope 421 and one of the outer surfaces 411 and form a flat surface chamfering the boundary of the inner slope 421 and the one of the outer surfaces 411. The inner surface 412 of the first arm 41A and the inner surface 412 of the second arm 41B also form a right angle.

The first base body 4 includes the inner slope 421 above which the retroreflector 31 is located and further includes the outer slopes 422 on both sides of the inner slope 421. This configuration provides a wider solid angle range, within which the surveying device 102 or any other suitable device can attain collimation with the retroreflector 31.

As illustrated in FIG. 4, the distal end surface 413 of the first arm 41A and the distal end surface 413 of the second arm 41B form the same plane B. The distal end surface 413 of the first arm 41A tilts at an acute angle of 45 degrees from outer surfaces 411 of the first arm 41A. The distal end surface 413 of the second arm 41B also tilts at an acute angle of 45 degrees from the outer surface 411 of the second arm 41B. That is, the distal end surfaces 413 tilt from the longitudinal directions (i.e., the directions of extension) of the first and second arms 41A and 41B in such a way that each distal end surface 413 makes an angle of 45 degrees with the longitudinal direction of the first and second arm 41A or 41B corresponding thereto. As illustrated in FIG. 3, the first base body 4 includes suspension point parts 43 on upper surfaces 414 of the first and second arms 41A and 41B, respectively. The suspension point parts 43 each include an annular member 431. The annular member 431 is pivotably attached to corresponding one of the upper surfaces 414. The annular member 431 might be used to secure thereto a suspender (not illustrated), such as a carabiner or a rope-like tool to hold the first base body 4 or the target support tool 1. This can help to prevent the first base body 4 or the target support tool 1 from falling down.

The first base body 4 includes a recess 423 at the inside corner of the bent 42. The recess 423 extends vertically (i.e., in the direction orthogonal to the longitudinal directions of the first and second arms 41A and 41B). The recess 423 has an inner surface recessed in an arc as illustrated in the plan view of FIG. 4. The recess 423 functions as a relief for reducing the inference with the outside corner of the bent 52 of the second base body 5 when the second base body 5 is placed on the inner surfaces 412 of the first base body 4.

The magnets M1 are also located on the inner surfaces 412 of the first and second arms 41A and 41B. The magnets M1 according to this embodiment may be, for example, magnetic members, such as a neodymium magnet. The magnets M1 are embedded in the first and second arms 41A and 41B. In this manner, the magnetic force exerted by the magnets M1 can detachably attach the first base body 4 to the second base body 5. Note that the magnetically attached first and second base bodies 4 and 5 are easily detachable by moving the first base body 4 in a direction going apart from the second base body 5, for example, with fingers or other means hooking the first base body 4 on the distal end surfaces 413.

The retroreflective member 3 includes the retroreflector 31 and a support part 32 connected to the retroreflector 31. The retroreflector 31 may be, for example, a prism with retroreflective characteristics. The support part 32 is formed in the shape of a long bar. The retroreflector 31 is located at the outside corner of the bent 22 (42) and offset from the base member 2 on a bisector of an internal angle between the first and second arms 21A and 21B, the bisector being coaxial with the axis A of symmetry.

The inner slope 421 described above has a support hole 44 that is a through-hole for receiving and holding the support part 32 therein. The retroreflective member 3 is fixed to the first base body 4 with the support part 32 inserted into the support hole 44 at a predetermined depth.

The second base body 5 includes the first and second arms 51A (51) and 51B (51) connected to form a right angle at the bent 52 so as to form the shape of a substantially L-shaped plate as a whole. As illustrated in FIG. 4, the first and second arms 51A and 51B according to this embodiment are symmetric in shapes and geometries with respect to the axis A of symmetry. The second base body 5 is a plate member with a substantially uniform thickness. The outer surfaces 511 of the first arm and second arms 51A and 51B form a right angle. The inner surfaces 512 of the first arm and second arms 51A and 51B also form a right angle.

The edges of the distal ends 513, 513 of the first arm 51A and the second arm 51B are parallel to each other on the same plane. The first and second arms 51A and 51B include a plurality of openings 514 that are through-holes symmetrically located with respect to the axis A of symmetry.

As illustrated in FIG. 3 and other figures, the first and second arms 51A and 51B each include a detachable part 53 at its distal end. The detachable part 53 includes a magnet support part 54, a hole 55 that guides the magnet support part 54, and a pivotable support part 561 that pivotally supports the magnet support part 54.

The first and second arms 51A and 51B each include notches 56 recessed rectangularly in shape from both lateral edges opposite to each other in a width direction. Each pivotable support part 561 extends to bend in an L-shape from the inner edge corresponding to the bottom of one of these notches 56 beyond the corresponding outer surface 511. The distal ends of the pivotable support parts 561 of the detachable parts 53 are substantially parallel to each other.

Figure 5:
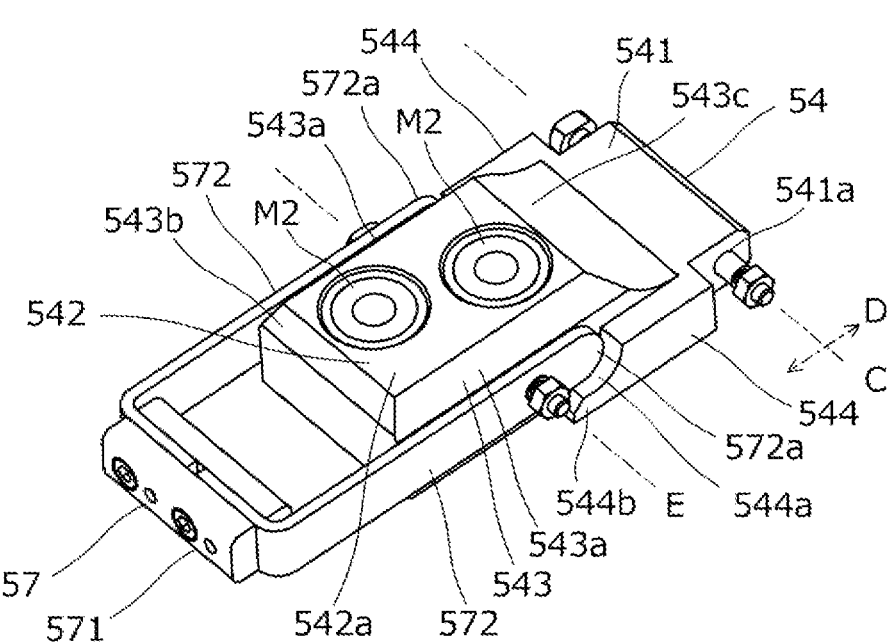
FIG. 5 is a perspective view of a magnet support part and a releaser according to the first embodiment.

FIG. 5 is a perspective view of each magnet support part 54 and corresponding one of releasers 57 according to the first embodiment. The magnet support part 54 is formed in the shape of a long rectangular thick plate. The magnet support part 54 includes a proximal part 541 provided with a bearing 541a, and a main body 542 thicker than the proximal part 541. The main body 542 includes, on one surface thereof, a long rectangular magnetic attachment surface 542a provided with the magnets M2. The magnets M2 are placed to be flush with the magnetic attachment surface 542a in this embodiment. However, the magnet(s) M2 may be embedded in the magnet support part 54 so that the magnet(s) M2 can have a predetermined distance (offset) from the magnetic attachment surface 542a. The magnets M2 are provided at least on the inner surfaces (i.e., the inner surfaces 512) of the first and second arms 21A and 21B when the magnet support part 54 is pivoted in such a way that the magnetic attachment surface 542a will be located inside the hole 55 (see also FIG. 7). In this context, the inner surfaces 512 are ones on the internal corner side of the bent.

The main body 542 includes a taper 543 along the outer peripheral edge of the magnetic attachment surface 542a. The taper 543 is formed by tapers 543a, 543b, 543c, and 543a at each of the edge around, it is formed like a rectangular loop in a plan view as viewed from the magnetic attachment surface 542a. The tapers 543a extend along the edges of the main body 542 in the lateral direction (i.e., the axial direction along a pivot C) while the tapers 543b and 543c extend along the edges located in a radial direction D perpendicular to the pivot C of corresponding one of the pivotable support parts 561. The tapers 543a and 543b are chamfered surfaces with substantially the same tilt angle. On the other hand, the taper 543c near the proximal part 541 is tilted with a concave shape.

The magnet support part 54 includes projections 544 on both sides in the direction along the pivot C. Each projection 544 includes a relief portion 544a and a regulating portion 544b at its outer edge away from the pivot C in the radial direction D (i.e., at the distal edge). The relief portion 544a is a concave shape in a side view, and the relief portion 544a is located closer to a handle 571 of the releaser 57 (at a pivot E). The regulating portion 544b, a part of which closer to the magnetic attachment surface 542a is adjacent to the relief portion 544a, projects toward the handle 571.

The releaser 57 is formed substantially in a U-shape and includes the handle 571 and support rails 572, which extend from both ends of the handle 571 in the same direction. The releaser 57 is pivotable about the pivot E with the support rails 572, which are connected to the side surfaces of the main body 542. Each support rail 572 includes a release projection 572a projecting in the shape of a semi-circular arc plate at an end opposite to the handle 571 with respect to the pivot E. The pivoting of the releaser 57 is regulated within a predetermined angle range by the release projection 572a and the regulating portion 544b abutting on each other.

Each hole 55 is an opening penetrating the second base body 5 in the thickness direction of its plate-like shape thereof, and is formed substantially in a long rectangular shape (see also FIG. 3). The hole 55 is shaped conformably to the outer peripheral shape of the magnetic attachment surface 542a, which projects on a surface of the magnet support part 54. The hole 55 guides the insertion and extraction of the magnet support part 54 in such a way that the tapers 543 of the magnet support part 54 abut or slide on an intern edge of the hole 55. The corresponding pivotable support part 561 described above pivotably supports the magnet support part 54 with the magnetic attachment surface 542a, which is exposed through the hole 55 (see also a target support tool 1-1 in FIG. 7).

The first and second arms 51A and 51B each include a suspendable part 515 formed in the shape of a substantially L-shape plate and placed near the distal end. The suspendable part 515 includes a substantially rectangular opening penetrating the suspendable part 515 in the thickness direction of its plate-like shape thereof. The suspendable part 515 is for securing thereto a suspender (not illustrated), such as a carabiner or a rope-like tool, to hold the first base body 4 or the target support tool 1. This can help to prevent the target support tool 1 from falling down.

Figure 6:
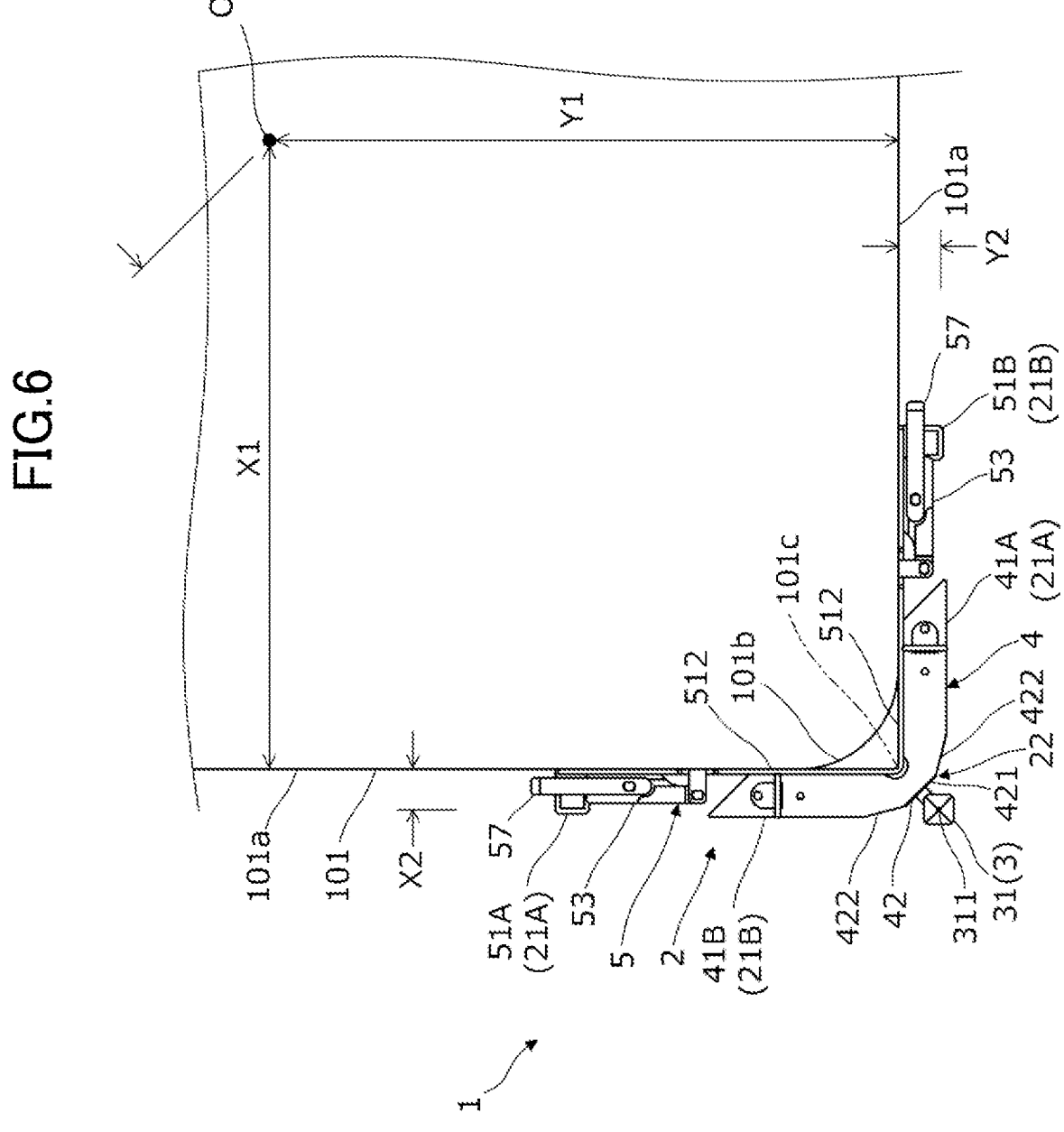
FIG. 6 is an enlarged schematic view of a target support tool attached to an attachment target in FIG. 1 as viewed in a Q-direction.

Here, an example use case of the target support tool 1 will be described. FIG. 6 is an enlarged schematic view of the target support tool 1 attached to the attachment target 101 in FIG. 1 as viewed downward from above (in a Q-direction). The attachment target 101 according to this embodiment has a substantially square outer shape in a cross-sectional view. Since the attachment target 101 has magnetic characteristics, the first arm 51A (21A) is attached to one of the outer surfaces 101a by the magnetic force of the magnets M2 (see FIG. 3) placed in the detachable part 53, while the second arm 51B (21B) is attached to the other outer surface 101a by the magnetic force as well.

Figure 7:
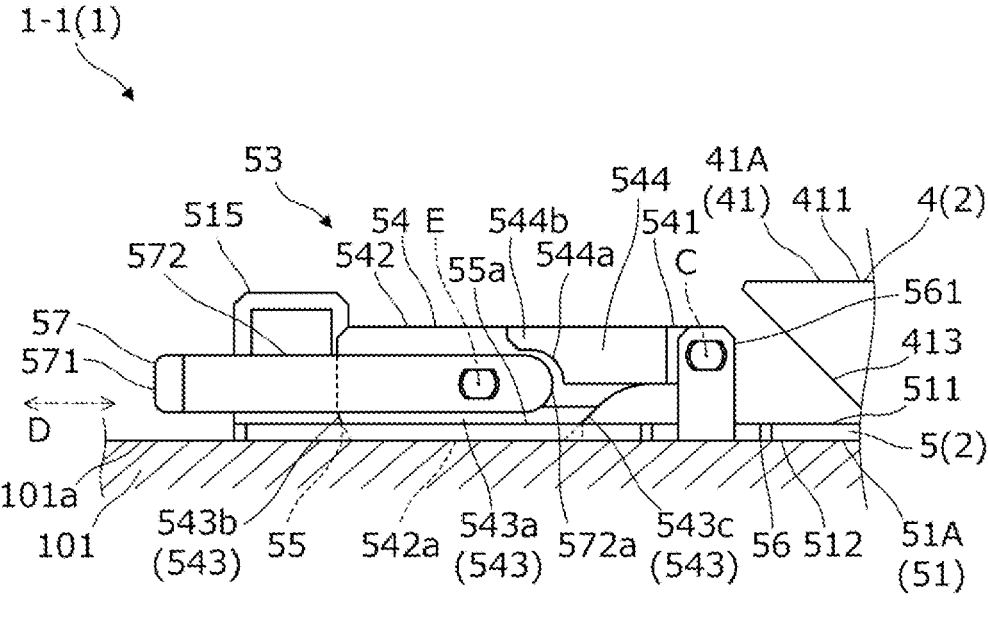
FIG. 7 is a side view showing an example operation of a detachable part according to the first embodiment.
Figure 7:
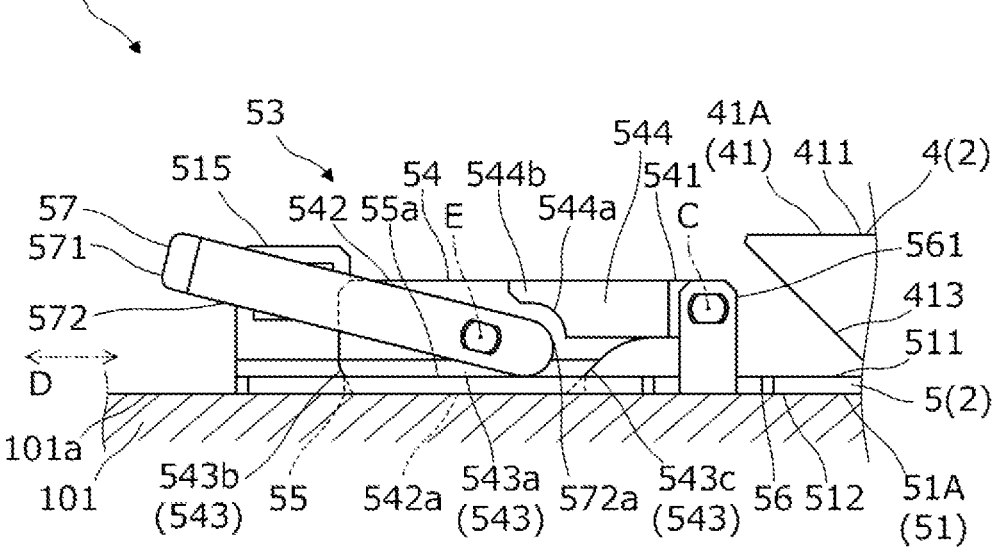

As illustrated in the target support tool 1-1 in FIG. 7, the target support tool 1 magnetically attaches to the attachment target 101, of which each attachment surface 542a and one of the inner surfaces 512 abut on one of the outer surfaces 101a on the same surface. In this manner, the target support tool 1 is at least partially in surface contact with each outer surface 101a, so that the target support tool 1 can stably attach to the attachment target 101.

Even if rattling (e.g., caused by a dimensional deviation from a design value) is occurred between any hole 55 and the inserted part (i.e., the projection having the magnetic attachment surface 542a) of the corresponding magnet support part 54, the taper 543 allows them to stably attach each other, because the inner edge of the hole 55 abuts on and is supported by the magnet support part 54 magnetically attached and fixed to the attachment target 101. This can help to prevent the base member 2 (i.e., the whole target support tool 1) from falling down and being displaced. As a result, the retroreflector 31 becomes more stably fixed to the base member 2, and the retroreflector 31 can be stably supported with respect to the attachment target 101.

Referring back to FIG. 6, since the attachment target 101 has the outer shape substantially in a regular square shape in a cross-sectional view, a distance X1 is equal to a distance Y1 (i.e., X1=Y1), where the distance X1 is measured from the center O of the attachment target 101 to one of the outer surfaces 101a in a first direction (e.g., the horizontal direction in FIG. 6), and the distance Y1 is measured from the center O to the other outer surface 101a in another, second direction (e.g., the vertical direction in FIG. 6) orthogonal to the first direction.

On the other hand, the distance X2 between the retroreflector 31 of the target support tool 1 and one of the outer surfaces 101a of the attachment target 101 (i.e., the inner surface 512 of the second arm 51B) in the first direction (i.e., the horizontal direction in FIG. 6) is a design value, which is given in advance and known. For example, the point for attaching the retroreflector 31 may be set by a user (i.e., an operator) of the surveying device 102. The distance Y2 between the retroreflector 31 and the other outer surface 101a of the attachment target 101 (i.e., the inner surface 512 of the first arm 51A) in the second direction (i.e., the vertical direction in FIG. 6) is a design value, which is given in advance and known. By measuring the position (i.e., the spatial coordinates) 311 of the retroreflector 31 using the surveying device 102 (see FIG. 1), the position of the center O of the attachment target 101, at which the retroreflector 31 is attached, can be acquired by offsetting the coordinate in the first direction from the position 311 by the sum of the distances X1 and X2 and offsetting the coordinate in the second direction from the position 311 by the sum of the distances Y1 and Y2. Note that the procedure of calculating the position of the center O is not limited to this.

In order to attach the target support tool 1 to the attachment target 101, first, the base member 2 is put to abut on any corner 101b of the attachment target 101, to which the target support tool 1 is intended to attach. Accordingly, the first arm 21A is substantially in surface contact with one of the outer surfaces 101a, while so is the second arm 21B with the other outer surface 101a. This allows the target support tool 1 to be placed at a temporary position easily but stably.

Next, as illustrated in the target support tool 1-1 in FIG. 7, each detachable part 53 pivots about the pivot C in order to insert a part of the projection of the corresponding magnet support part 54 including the magnetic attachment surface 542a into the corresponding hole 55. At this time, the inner edge of the hole 55 guides the taper 543 of the magnet support part 54 on the outer periphery of the magnetic attachment surface 542a; the detachable part 53 magnetically attaches to the attachment target 101 through the hole 55 at the planned attachment point at which the target support tool 1 is temporarily positioned, thereby stably supporting the target support tool 1. As described above, using the target support tool 1 allows to perform, at different timings, the positioning by abutting on the attachment target 101 (e.g., a steel frame) and the magnetically attaching to the attachment target 101, so that the retroreflector 31 can attach to the intended position precisely.

Next, an example operation of detaching each detachable part 53 will be described with reference to FIGS. 7 and 8. The target support tool 1-1 illustrated in FIG. 7 is magnetically attached to the attachment target 101. In order to detach the target support tool 1 from the attachment target 101, when the handle 571 of the releaser 57 is pivoted about pivot E in a direction away from the attachment target 101 by holding the handle 571 as illustrated in a target support tool 1-2, the release projection 572a of the releaser 57 will abut on an abutting target 55a (illustrated in FIG. 2 as well), which is the outer peripheral edge (surface) of the hole 55.

Figure 8:
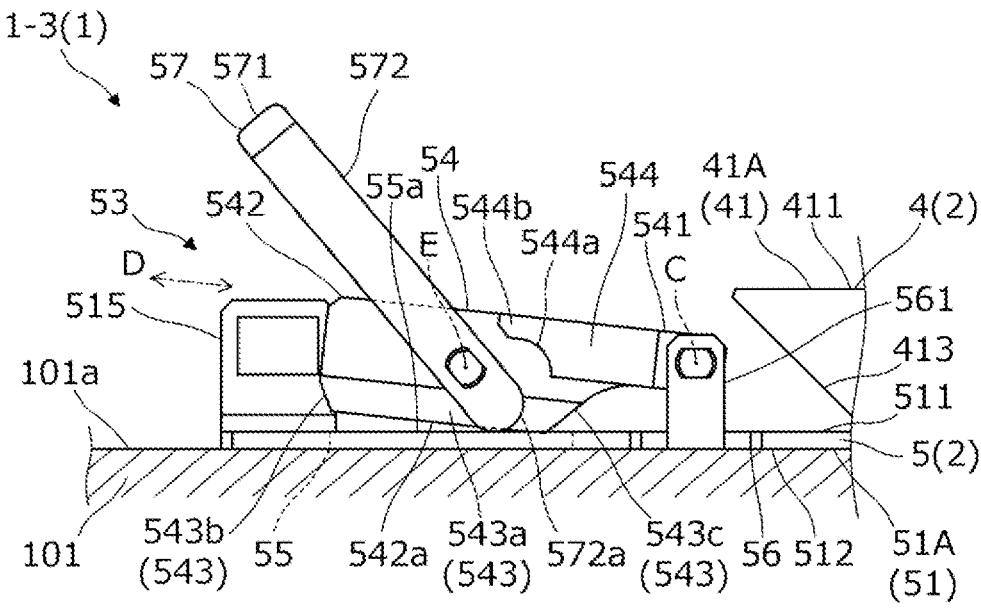
FIG. 8 is a side view showing the example operation of the detachable part according to the first embodiment.
Figure 8:
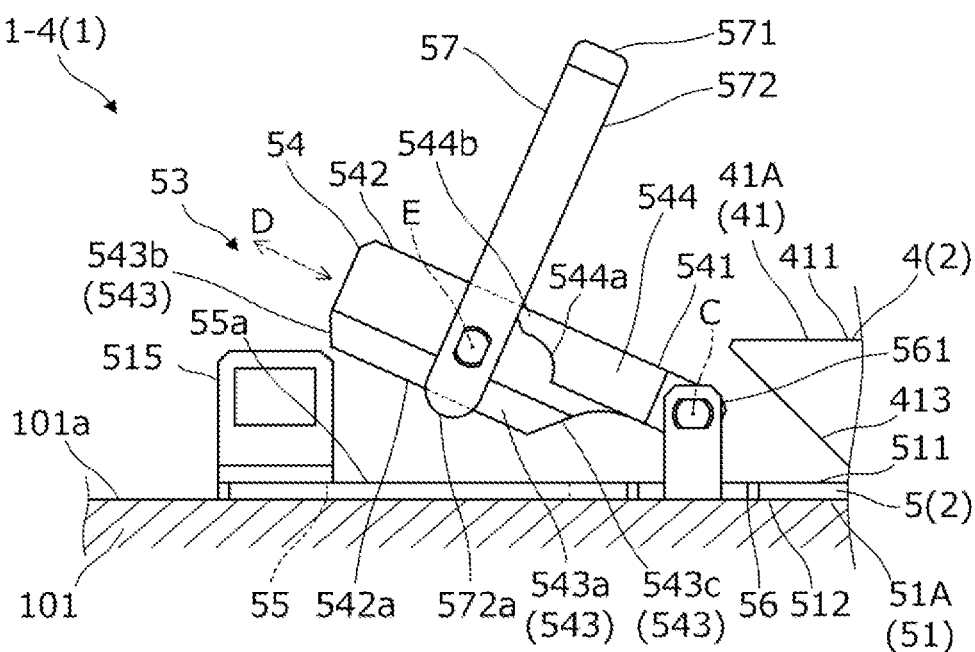

As illustrated in a target support tool 1-3 in FIG. 8, by operating the handle 571 in the direction away from the attachment target 101, the magnet support part 54 including the magnets M2 will be moved in the direction away from the attachment target 101 against the magnetic force. At this time, the point at which the release projection 572a abuts on the abutting target 55a serves as a fulcrum, the handle 571 serves as an effort, and the pivot E serves as a load (what is called a "second-class lever"). In other words, the releaser 57 includes the fulcrum part (i.e., the pivot E) supported pivotably with respect to the magnet support part 54, the effort part (i.e., the handle 571) on one side of the fulcrum part, and the load part (i.e., the release projection 572a) on the other side of the fulcrum part. The load part can press the abutting target 55a which is the opening edge of the hole 55. The pivot E functions such that the release projection 572a receives the reaction force from the abutting target 55a and is pushed back by the reaction force, so that the magnet support part 54 will move in the direction away from the attachment target 101.

As illustrated in a target support tool 1-4, once the handle 571 is further pulled in the direction away from the attachment target 101, the magnet support part 54 will pivot about the pivot C and move in the direction away from the attachment target 101. In this manner, the user can easily detach the target support tool 1 from the attachment target 101 by releasing the detachable part 53 using the releaser 57 for the first arms 41A and 51A (21A) and the second arms 41B and 51B (21B).

Figure 9:
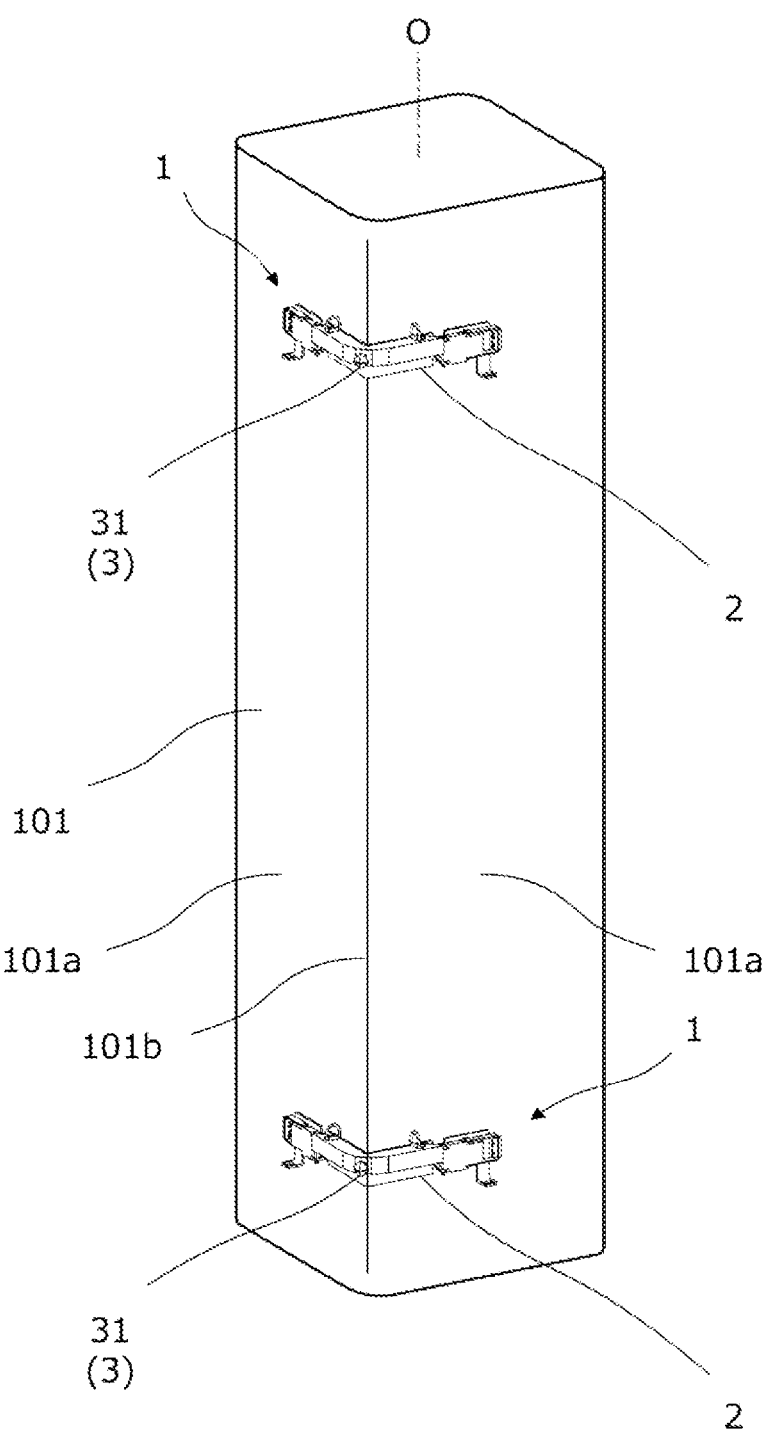
FIG. 9 illustrates an example where a plurality of target support tools, each being the target support tools according to the first embodiment, are attached to an attachment target.

The target support tool 1 according to this embodiment is configured such that the inner surfaces 512 formed at a right angle are abuttable on the corresponding right-angled outer surfaces 101a. Accordingly, as illustrated in FIG. 9, a plurality of retroreflectors 31 can be attached at some positions at a predetermined corner 101b of the attachment target 101 while being easily aligned in the vertical direction (along the axis) of the attachment target 101, without the need of performing any extra measurement. Since the retroreflectors 31 fixed to the same attachment target 101 is parallel to the axis of the center O of the attachment target 101, the tilt of the attachment target 101 can be acquired by measuring the coordinates of the retroreflectors 31.

Second Embodiment

Figure 10:
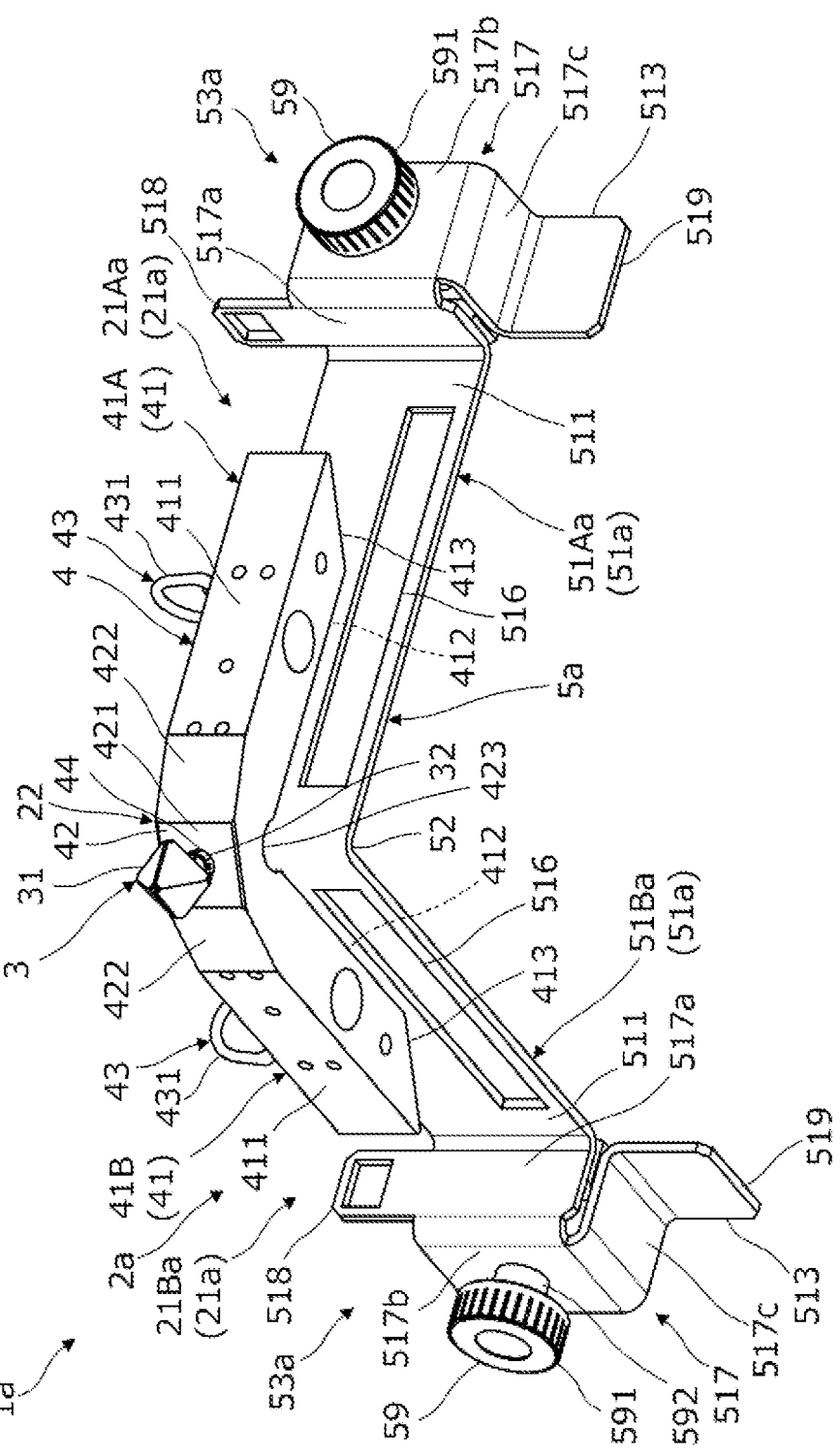
FIG. 10 is a perspective view of a target support tool according to a second embodiment of the present disclosure as viewed from the lower front.
Figure 11:
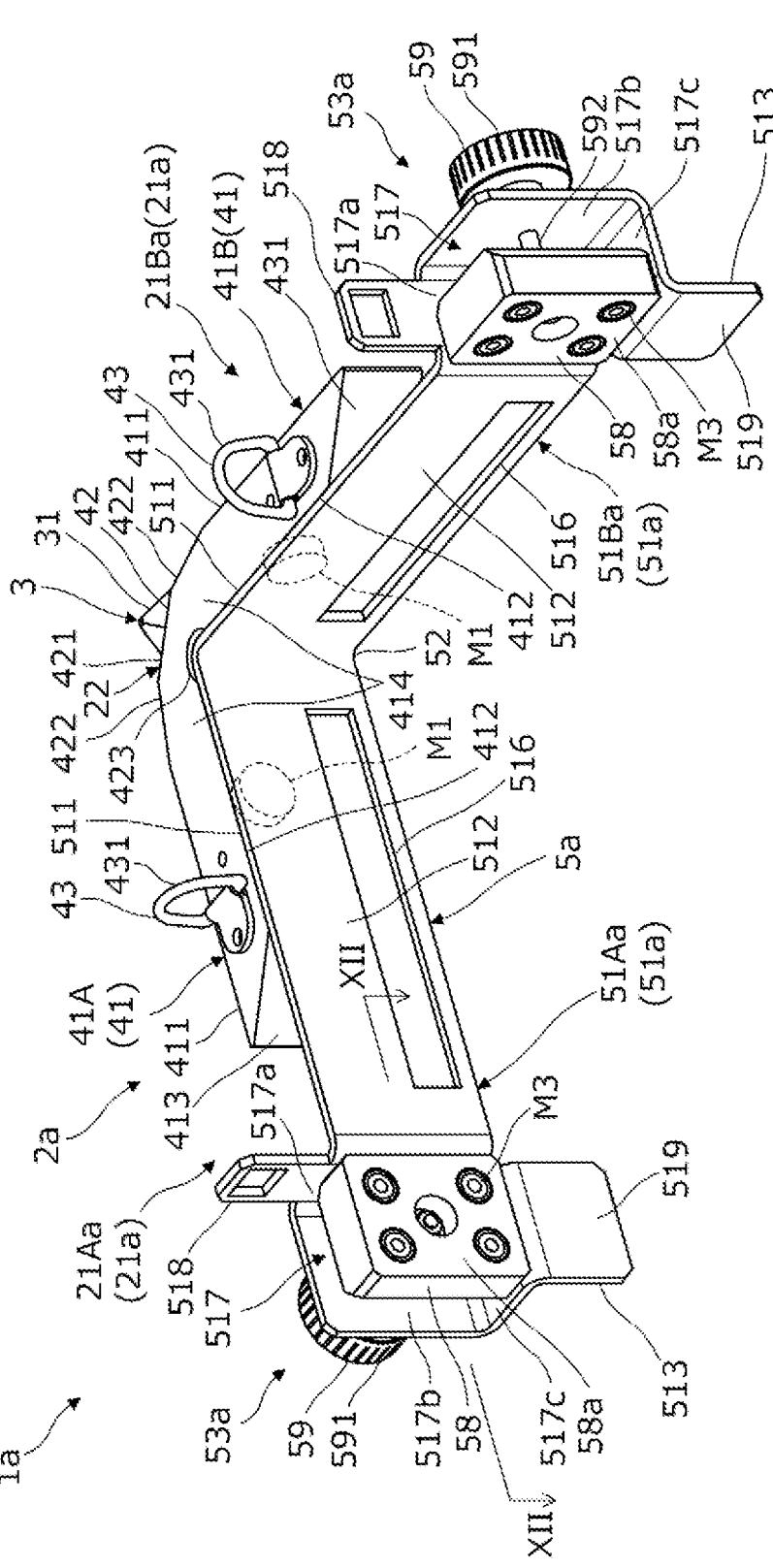
FIG. 11 is a perspective view of the target support tool according to the second embodiment as viewed from the upper back.

Next, a second embodiment will be described. FIG. 10 is a perspective view of a target support tool 1a according to a second embodiment as viewed from the lower front, while FIG. 11 is a perspective view of the target support tool 1a as viewed from the upper back. In the description of the target support tool 1a according to the second embodiment, the same reference numbers and characters as those of the target support tool 1 are used to represent equivalent configurations, and the detailed explanation thereof will be omitted or simplified.

A base member 2a of the target support tool 1a includes a second base body 5a in place of the second base body 5 of the target support tool 1 according to the first embodiment. The first base body 4 has the same or similar configuration to the target support tool 1 according to the first embodiment.

The second base body 5a includes first and second arms 51Aa (51a) and 51Ba (51a) connected to form a right angle at the bent 52, thereby being substantially in the shape of an L-shaped plate as a whole. The distal end 513 of the first arm 51Aa and the distal end 513 of the second arm 51Ba are parallel to each other and are thus located on the same plane. The first and second arms 51Aa and 51Ba include long-rectangular openings 516 that are through-holes parallel to the second base body 5a at symmetric locations with respect to the axis of symmetry (corresponding to the axis A of symmetry illustrated in FIG. 4) at the bent 52.

The first and second arms 51Aa and 51Ba each include, at its distal end, a detachable part 53a in place of the detachable part 53 illustrated in the first embodiment. Each detachable part 53a includes a magnet support part 58, and a guide 517 that guides the magnet support part 58. The magnet support part 58 is formed in the shape of a long rectangular thick plate. The longitudinal direction of the magnet support part 58 extends in the lateral directions of the first and second arms 51Aa and 51Ba.

Each magnet support part 58 includes, on one surface thereof, a long rectangular magnetic attachment surface 58a provided with a plurality of magnets (i.e., a magnetic support parts) M3. The magnets M3 are placed to be flush with the magnetic attachment surface 58a in this embodiment. However, the magnets M3 may be embedded in the magnet support part 58, so that the magnet(s) is/are provided with a predetermined distance (offset) from the magnetic attachment surface 58a. The magnets M3 are provided at least on the inner surfaces (i.e., the inner surfaces 512) of the first arm 21Aa (21a) and the second arm 21Ba (21a), where the inner surfaces are on the internal corner side of the bent.

The magnet support part 58 is placed in the guide 517, which is formed by bending a part of the corresponding arm 51a. The guide 517 includes a first sidewall 517a, a second sidewall 517b, and a third sidewall 517c. The first sidewall 517a is a sidewall proximal to the bent 52 with respect to the magnet support part 58. The second sidewall 517b faces a reverse side of the magnetic attachment surface 58a. The third sidewall 517c is an other sidewall along the width direction of the arm 51a. The first to third sidewalls 517a to 517c each have a flat surface and are substantially perpendicular to each other.

The detachable part 53a includes a releaser 59. The releaser 59 includes a nob 591 and a connector 592. The nob 591 is formed in the shape of a short cylindrical column knurled on the outer periphery. The connector 592, which is slidably inserted into a through hole of the second sidewall 517b, connects the nob 591 and the magnet support part 58 with each other. The magnet support part 58 is thus movable, for a predetermined distance, in directions toward and away from the second sidewall 517b (i.e., in directions toward and away from the attachment target 101 when being attached with the target support tool 1a) (see also FIG. 12). In addition, the first and third sidewalls 517a and 517c are formed close to or in sliding contact with a side surface of the magnet support part 58, so that the first and third sidewalls 517a and 517c can function as a guide wall that helps to prevent from unexpected pivoting of the magnet support part 58.

The first sidewall 517a includes, at one end, a suspendable part 518, which has the shape of a rectangular plate and projects at the end. The suspendable part 518 has a substantially rectangular opening penetrating the suspendable part 518 in the thickness direction of its plate-like shape. The suspendable part 518 is for securing thereto a suspender (not illustrated), such as a carabiner or a rope-like tool, to hold the first base body 4 or the target support tool 1. This can help to prevent the target support tool 1 from falling down.

The third sidewall 517c includes a brim 519 formed in the shape of a rectangular plate on the other side opposite to the suspendable part 518. The brim 519 has a flat surface substantially on the same plane as the inner surface 512 of the second base body 5a, thereby facilitating stable support for the target support tool 1a with the brim 519 and the magnet support part 58a together abutting on the attachment target 101.

Figure 12:
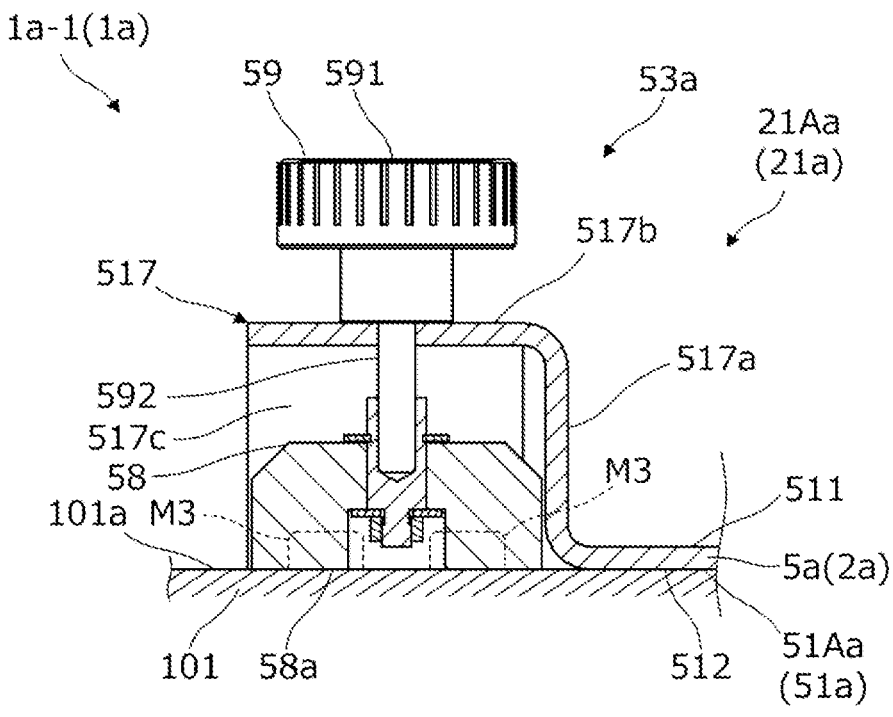
FIG. 12 is a cross-sectional view taken along line XII-XII, illustrating an example operation of a detachable part according to the second embodiment.
Figure 12:
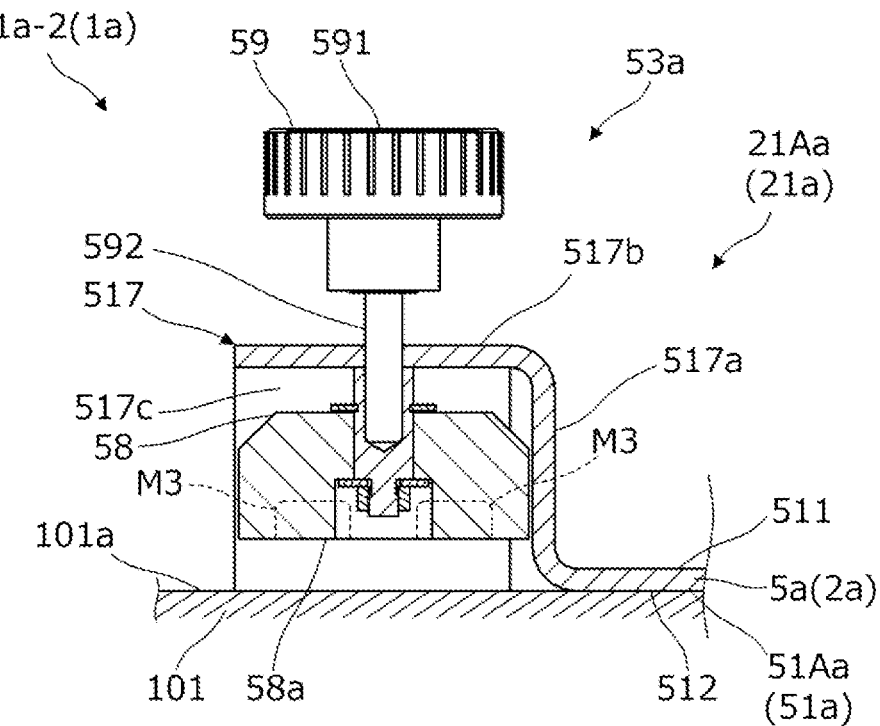

Here, an example use case of the target support tool 1a will be described with reference to FIG. 12. FIG. 12 is a cross-sectional view of a target support tool 1a-1, which has abutted on (or has attached to) the attachment target 101, taken along line XII-XII in FIG. 11.

Since the attachment target 101 has magnetically attachable, the first arm 21Aa attaches to one of the outer surfaces 101a at the corner 101b by the magnetic force of the magnets M3 of the detachable part 53a, while the second arm 21Ba (not illustrated) also attaches to the other outer surface 101a by the magnetic force of the magnets M3 of detachable part 53a. The target support tool 1 magnetically attaches to the attachment target 101 with each magnetic attachment surface 58a, one of the inner surfaces 512, and the brim 519 of the target support tool 1, on the same plane, in surface contact with one of the outer surfaces 101a of the attachment target 101. In this manner, the target support tool 1a is also at least partially in surface contact with each outer surface 101a, so that the target support tool 1a is also stably attached to the attachment target 101. Each magnet support part 58 magnetically attached to the attachment target 101 is in the shape of a quadrangular short column and includes four flat outer peripheral side surfaces. One of the outer peripheral side surfaces abuts on the first sidewall 517a so as to restrict the movement of the base member 2a with respect to the attachment target 101 (i.e., restrict the movement to the left in FIG. 12). Another one of the outer peripheral side surfaces abuts on the third sidewall 517c so as to restrict the movement of the base member 2a with respect to the attachment target 101 (i.e., restrict the movement to the front in FIG. 12). As a result, the retroreflector 31 fixed to the base member 2a is prevented from positional displacement and stably supported with respect to the attachment target 101.

In order to attach the target support tool 1a to the attachment target 101, first, the base member 2a is put to abut on a corner 101b of the attachment target 101, to which the target support tool 1 is to attach. At this time, the first arm 21Aa is substantially in surface contact with one of the outer surfaces 101a, while so is the other, second arm 21Ba with the other outer surface 101a. As a result of this, this allows the target support tool 1 to place at a temporary position easily but stably. Next, as illustrated in the target support tool 1a-1 in FIG. 12, each detachable part 53a is operated to move closer to the attachment target 101. This allows the corresponding magnet support part 58 including the magnetic attachment surface 58a to abut on the outer surface 101a. Accordingly, the detachable part 53a magnetically attaches to the attachment target 101 so that the target support tool 1a could stably place on an intended position to be fixed from the temporary position. As described above, using the target support tool 1a allows to perform, at different timings, the positioning by abutting on the attachment target 101 (e.g., a steel frame) and the magnetically attaching to the attachment target 101, so that the retroreflector 31 can attach to the intended position precisely.

In order to detach the detachable part 53a, the user releases the detachable part 53a using the releaser 59 for the first arms 41Aa and 51Aa (21Aa) and the second arms 41Ba and 51Ba (21Ba). The target support tool 1a-1 with each magnet support part 58 in FIG. 12 abutting on the attachment target 101 is released in such a way that the user holds the nob 591 of the releaser 59 and moves the magnet support part 58 in the direction away from the attachment target 101 against the magnetic force. Accordingly, as illustrated in the target support tool 1a-2, the magnet support part 58 easily detaches from the attachment target 101. Note that the movement of the magnet support part 58 is restricted by wider dimensional parts, which are provided on both sides (i.e., above and below the 517b in FIG. 12) in the axial direction of the connector 592, and which would abut on the opening edge of the through hole in the second sidewall 517b. Once the magnet support part 58 is away from the corresponding outer surface 101a, the target support tool 1a will easily detach from the attachment target 101.

In this manner, according to the second embodiment, the detachable part 53a, can be configured with the magnets M3 so that the detachable part 53a will be easily attachable to and detachable from the attachment target 101.

First Variation

Figure 13:
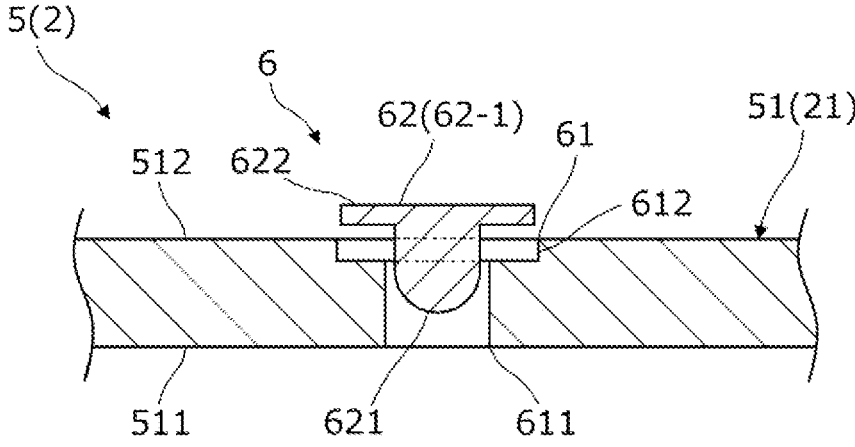
FIG. 13 is a schematic view of a check mechanism according to a first variation.
Figure 13:
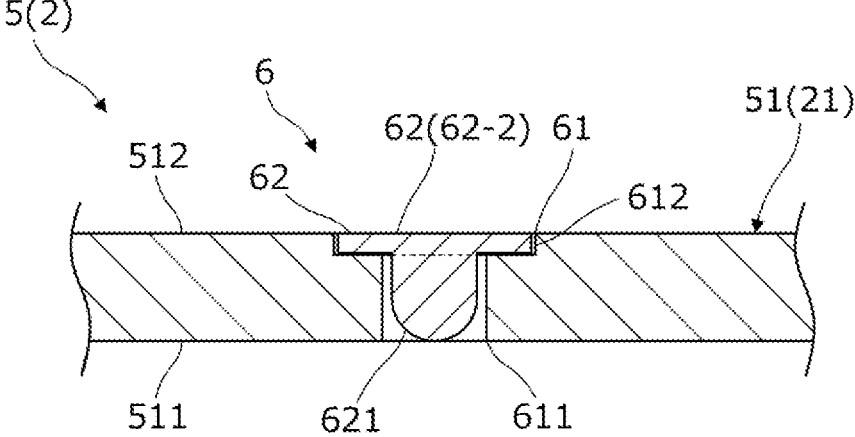

Next, a first variation of the present disclosure will be described. Described in the first variation is a configuration with a check mechanism 6, which can be provided in the target support tool 1 (including the target support tool 1a) described above. FIG. 13 is a schematic view of the check mechanism 6. The check mechanism 6 is placed, for example, in an arm 51 (one or each of the first and second arms 51A and 51B) of the second base body 5. The check mechanism 6 allows the user to easily check whether the target support tool 1 surely attaches to the attachment target 101. The check mechanism 6 is placed in such a part of the target support tool 1 that moves closer to the attachment target 101 when the target support tool 1 attaches to the attachment target 101 and moves away from the attachment target 101 when the target support tool 1 detaches from the attachment target 101.

The check mechanism 6 includes a housing 61 and a movable member 62. The housing 61 is an opening hole penetrating the second base body 5 in the thickness direction of its plate-like shape. The movable member 62 is received in the housing 61 movably back and forth along the plate thickness of the second base body 5. The housing 61 includes a smaller-diameter part 611 on the corresponding outer surface 511, and a counterbore 612 around the opening edge at one end of the smaller-diameter part 611 on the inner surface 512. The movable member 62 includes a columnar main body 621 to be housed in the smaller-diameter part 611, and a flange 622 at one end of the main body 621. The movement of the movable member 62 toward the outer surface 511 is restricted with the flange 622 abutting on the bottom of the counterbore 612, while the movement of the movable member 62 away from the outer surface 511 is also restricted, for example, with a regulating portion (not illustrated) of the housing 61 abutting on a regulated part (not illustrated) of the movable member 62. For example, the regulated part may be a projection, and the regulating portion may be a groove that guides the projection within a movement range.

The movable member 62 is biased toward the inner surface 512 by an elastic member (not illustrated), such as a spring. When the target support tool 1 is unattached to the attachment target 101, the movable member 62 will project beyond the inner surface 512 with a predetermined amount of projection (see a movable member 62-1).

On the other hand, when the target support tool 1 is attached to the attachment target 101 (i.e., when each inner surface 512 abuts on the attachment target 101), the movable member 62 is pressed from the inner surface 512 toward the housing 61 to move against the elastic force of the elastic member. The flange 622 of the movable member 62 moved into the housing 61 is received in the counterbore 612, and then the movable member 62 dose not project beyond the inner surface 512. When moving into the housing 61, the movable member 62 moves toward the outer surface 511 of the second base body 5, so that the distal end of the main body 621 will become substantially flush with the outer surface 511. Accordingly, this configuration allows the user to check whether the movable member 62 is flush with the outer surface visually by seeing the outer surface 511, or tactually by touching the outer surface 511, so that the user can easily determine whether the target support tool 1 surely attaches to the attachment target 101, or not.

In this manner, the check mechanism 6 changes in state in accordance with the attachment and detachment of the base member 2 to and from the attachment target 101 to allow to check of the attachment and detachment of the base member 2 using one or both of the visual and tactile senses. Accordingly, this configuration makes it possible for the user to easily check the attachment of the target support tool 1. Note that the check mechanism 6 may be placed in the target support tool 1a or any arm 41 of the first base body 4. One or more check mechanisms 6 may be provided.

Second Variation

Figure 14:
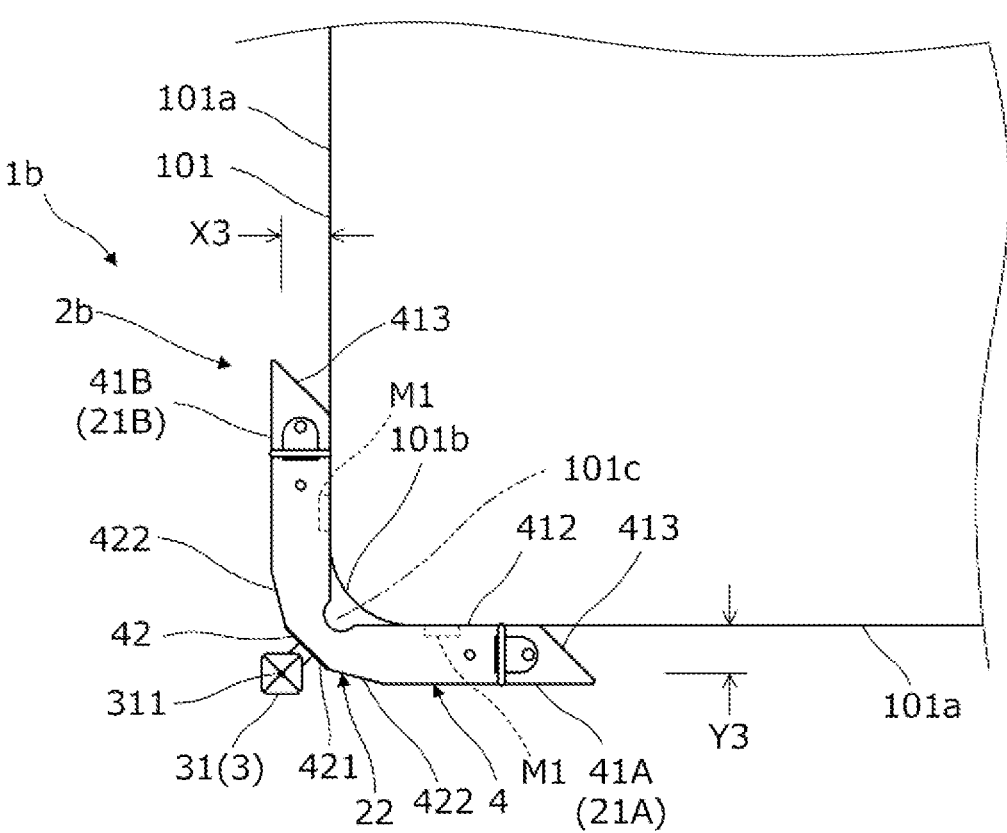
FIG. 14 illustrates an example use case of a target support tool according to a second variation.

Next, a second variation of the present disclosure will be described. The target support tools 1 and 1a described above in the first and second embodiments may be modified to measure using the first base body 4 alone. FIG. 14 illustrates a target support tool 1b including a base member 2 with the first base body 4, but without the second base body 5, 5a. The target support tool 1b includes first and second arms 21A and 21B, and which are configured shorter for the total length of the each arm than those in the target support tool 1 including the second base body 5, 5a. This second variation is suitable for, for example, a case where the attachment target 101 has a relatively small curvature radius at the corner 101b, a wider contact area can be secured between each inner surface 412 and the corresponding outer surface 101a can be secured. Accordingly, the target support tool 1b stably magnetically can attach to the attachment target 101 despite having no second base body 5, 5a.

The retroreflector 31 of the target support tool 1b and one of the outer surfaces 101a of the attachment target 101 (i.e., the inner surface 412 of the second arm 41B) are placed at a distance X3 in-between in the first direction (i.e., the horizontal direction in FIG. 14), while the distance Y3 is between the retroreflector 31 and the other outer surface 101a of the attachment target 101 (i.e., the inner surface 412 of the first arm 41A) in the second direction (i.e., the vertical direction in FIG. 14). The distances X3 and Y3 each are a design value, which have been given in advance and known. By utilizing the known design values, the position of the center O of the attachment target 101, at which the retroreflector 31 is attached, can be worked out by measuring the position (i.e., in the spatial coordinates) 311 of the retroreflector 31 with the surveying device 102, and offsetting the coordinate in the first direction from the position 311 by the sum of the distances X1 and X3 and offsetting the coordinate in the second direction from the position 311 by the sum of the distances Y1 and Y3. See FIG. 6 for the positional relationship between the center O and the distances X1 and Y1.

The target support tool 1b illustrated in FIG. 14 is easily moved away from the attachment target 101, for example, with a hand holding the respective distal end surfaces 413 of the first and second arms 41A and 41B. That is, each distal end surface 413 also functions as a releaser.

Figure 15:
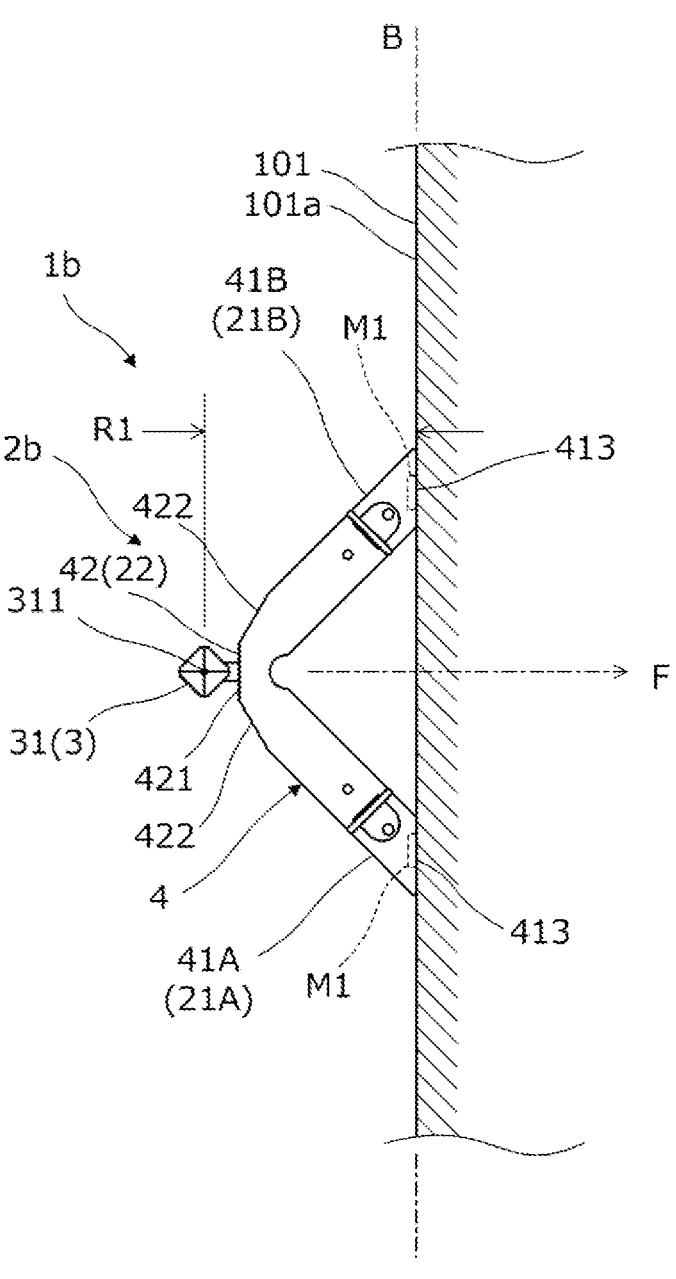
FIG. 15 illustrates another example use case of the target support tool according to the second variation.

As illustrated in FIG. 15, the target support tool 1b can also measure the position of the attachment target 101 by attaching the respective distal end surfaces 413 of the first and second arms 41A and 41B to the outer surfaces 101a of the attachment target 101 in face-to-face relationship. The target support tool 1b can magnetically attach to the attachment target 101 by the magnetic force of the magnets M1 with each distal end surface (one surface) 413 thereof on the attachment target 101, each distal end surface 413 serving as a magnetic attachment surface with the magnets M1.

The distance R1 between the retroreflector 31 of the target support tool 1b and the same plane B including the distal end surface 413 is given as a design value in advance. The distance (e.g., the distance X1 or Y1 in FIG. 6) between the center O of the attachment target 101 (not illustrated in FIG. 15) to the outer surface 101*a* is given in advance from design information. The direction F from the retroreflector 31 to the center O of the attachment target 101 can be set in advance based on the design information. By measuring the position (i.e., the spatial coordinates) 311 of the retroreflector 31 by using the surveying device 102 (see FIG. 1), the position of the center O of the attachment target 101 can be acquired, at which the retroreflector 31 is attached.

Figure 16:
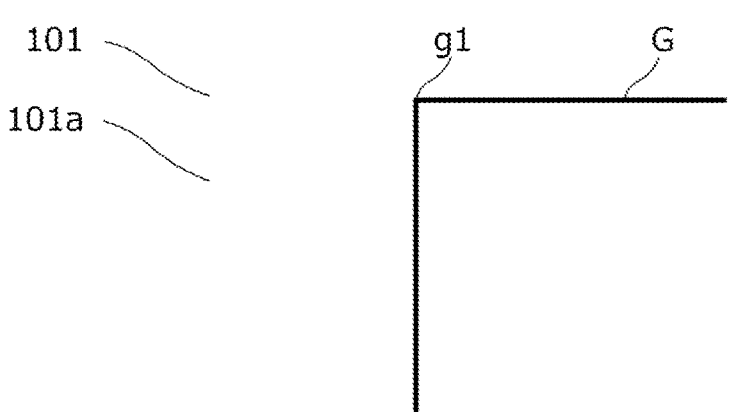
FIG. 16 illustrates a yet another example use case of the target support tool according to the second variation.
Figure 16:
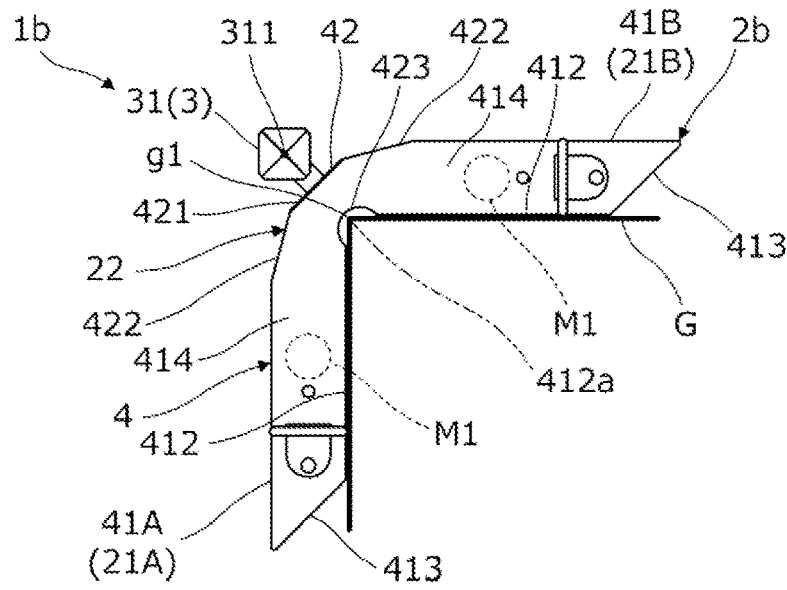
Figure 16:
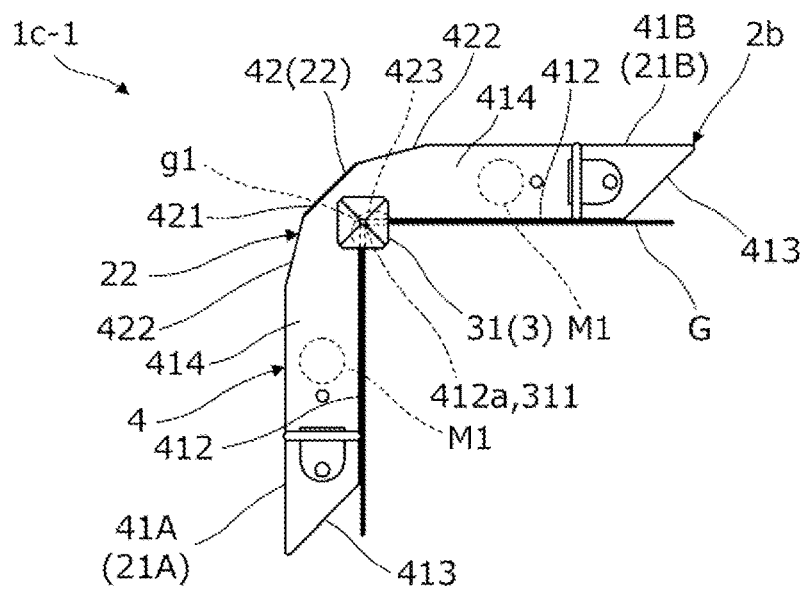

FIG. 16 illustrates another example use case of the target support tool 1*b*. This figure is a side view of the attachment target 101 in the normal line of the outer surfaces 101*a*. Two lines are drawn on the outer surfaces 101*a* as a guide index G, working as a guide to place the attachment target 101, which will be described in the following paragraphs. The guide index G in this figure are illustrated as being drawn with two straight lines intersecting each other at a right angle, which form an L-shape.

When the target support tool 1*b* is being placed on the attachment target 101, it will be placed at a position, for example, a place at which a reference position 412*a* would coincide with a reference point g1, where the reference position 412*a* is the imaginary intersection between the inner surfaces 412, and the reference point g1 is the intersection between the guide indexes G. In the example in FIG. 16, the guide index G are straight lines forming a right angle. Referring to the guide index G, the inner surfaces 412 of the first base body 4 (i.e., the base member 2*b*) are adjusted to be along the two lines of the guide index G, so that the reference position 412*a* and the reference point g1 will coincide with each other.

The target support tool 1*b* is widely open around the reference position 412*a* with the recess 423, which will allow the user to easily see the positions of the guide index G and the relative positions between the target support tool 1*b* and the guide index G. Accordingly, the recess 423 can function as a relief to allow to see the guide index G, the intersection (i.e., the corner 101*b*) of the lines drawn on the attachment target 101, this will allow the user to easily check where the target support tool 1*b* should be placed on with respect to the attachment target 101. With the recess 423 to see the guide indexes G, the target support tool 1*b* (i.e., the relative position of the retroreflector 31 with respect to the attachment target 101) can easily be attached at the same position as before, even when the target support tool 1 is repeatedly attached to and detached from the attachment target 101.

A target support tool 1*c*-1 illustrated in FIG. 16 is an example configuration in which the retroreflector 31 is located at a position where the center position 311 in a plan view from the inside of the bent 42 (22) and the upper surfaces 414 will coincide with the reference position 412*a* (i.e., the imaginary intersection between the inner surfaces 412). The retroreflector 31 of the target support tool 1*c*-1, for example, may form in a pyramid shape (i.e., a regular quadrangular pyramid) which is a half of a regular octahedron, and may be provided to be seeable at least in a direction of one of the upper surfaces 414.

An example attachment of the target support tool 1*c*-1 to the attachment target 101 will be described: First, abut the lower surfaces 415 (see also FIG. 2) of the target support tool 1*c*-1 on the outer surfaces 101*a* of the attachment target 101. At this time, by adjusting the inner surfaces 412 to be along the two lines of the guide index G respectively, the center position 311 of the retroreflector 31 can automatically coincide with the reference point g1. Thus, the user can easily position the retroreflector 31 on the target support tool

1*c*-1 by checking whether the center position 311 of the retroreflector 31 overlaps with the guide index G (i.e., whether the center position 311 of the retroreflector 31 overlaps the normal line of the outer surfaces 101*a* at the reference point g1).

As long as the position of the reference point g1 is determined, the guide index G may be drawn with an obtuse or acute angle, and the reference point g1 may be indicated with a point or a dot, or a tilted line or lines. Alternatively, the guide index G may be drawn with lines intersecting each other into a cross shape. The retroreflector 31 is transparent or translucent enough to see the reference point g1 on the outer surfaces 101*a* through; Although the target support tool 1*c* is leaningly attached to the outer surfaces 101*a* at a tilt, the retroreflector 31 will be easily and highly accurately re-attached to the attachment target 101 at a planned attachment point.

Third Variation

Figure 17:
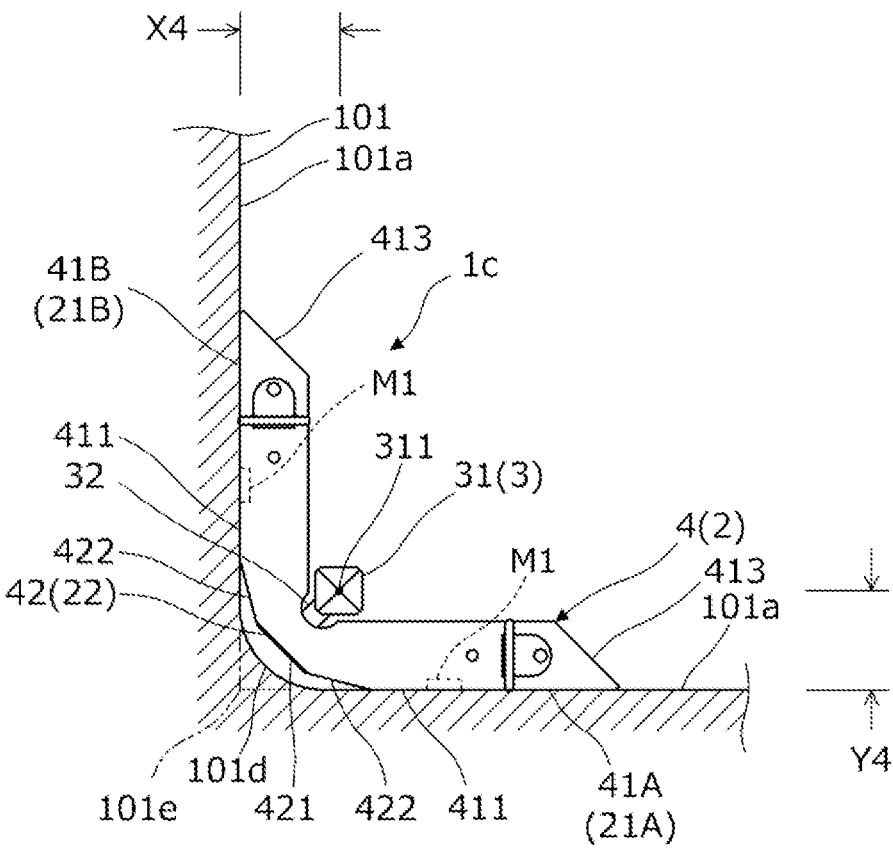
FIG. 17 illustrates an example use case of a target support tool according to a third variation.

Next, a third variation of the present disclosure will be described. FIG. 17 illustrates an example use case of the target support tool 1*c* according to the third variation. The target support tool 1*c* includes the retroreflector 31 at the internal corner (i.e., the inside or recessed corner) of the bent 42 of the base member 2 (i.e., the first base body 4), where the bent 42 form in an L-shape. The retroreflective member 3 is attached to the first base body 4 with the support part 32 engaged to the support hole 44 of the first base body 4 (see FIG. 4) from the inner side. The target support tool 1*c* can attach to the attachment target 101 by attaching to a recessed corner of inner walls in an indoor space, or a recessed corner of building materials at a construction, etc.

The retroreflector 31 of the target support tool 1*c* and one of the outer surfaces 101*a* of the attachment target 101 (i.e., the outer surface 411 of the second arm 41B) are placed at a distance X4 in-between in the first direction (i.e., the horizontal direction in FIG. 17), while the distance Y4 is between the retroreflector 31 and the other outer surface 101*a* of the attachment target 101 (i.e., the outer surface 411 of the first arm 41A) in the second direction (i.e., the vertical direction in FIG. 17). The distances X4 and Y4 each are a design value, which have been given in advance and known. By utilizing the known design values, the position of the corner 101*e* of the attachment target 101, at which retroreflector 31 is attached, can be worked out by measuring the position (i.e., the spatial coordinates) 311 of the retroreflector 31 with the surveying device 102 (see FIG. 1).

While such an example described above so far is such that the base member 2 of the target support tool 1*c* in FIG. 17 includes the first base body 4 alone, the base member 2 may include the first base body 4 and the second base body 5, 5*a* as in the first and second embodiments. In this case, the first base body 4 may be provided on the outer surfaces 511 or the inner surfaces 512 of the second base body 5, 5*a*.

When the first base body 4 is located on the outer surfaces 511 of the second base body 5, 5*a*, for example, the bent 52 of the second base body 5, 5*a* has an opening that has a common axis with the support hole 44 of the first base body 4 (see FIG. 4) and that allows the support part 32 of the retroreflective member 3 to insert and extract from the inner side. Accordingly, this enables the retroreflector 31 to be placed at the internal corner of the bent of the base member 2 including the first base body 4 and the second base body 5, 5*a*. The second base body 5, 5*a* may be magnetically attached to the attachment target 101 by the magnets M1 on the first base body 4. As an alternative, the second base body 5, 5a may be magnetically attached to the attachment target 101 by the magnets M2, M3 on the second base body 5, 5a, with the configuration of each detachable part 53, 53a exchanged between the outer and inner surfaces 511 and 512.

When the first base body 4 is located on the inner surfaces 512 of the second base body 5, 5a, the second base body 5, 5a may be magnetically attached to the attachment target 101 by the magnets M2, M3 on the second base body 5, 5a, with the configurations of each detachable part 53, 53a exchanged between the outer and inner surfaces 511 and 512.

Third Embodiment

Figure 18:
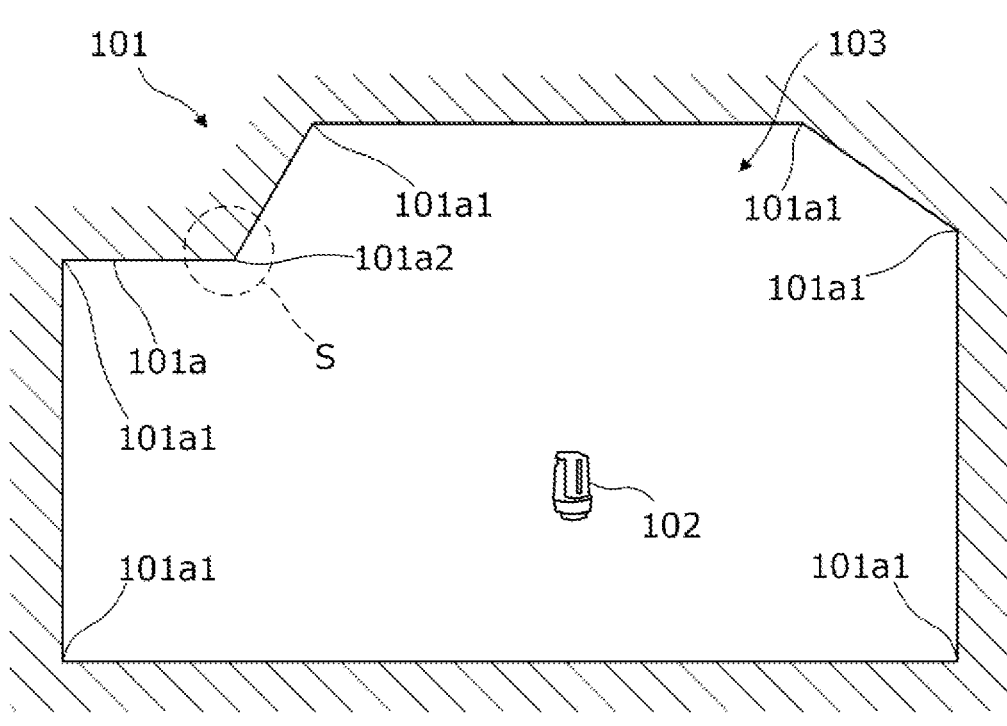
FIG. 18 is a schematic view showing an example use case and a configuration of a target support tool according to a third embodiment.
Figure 18:
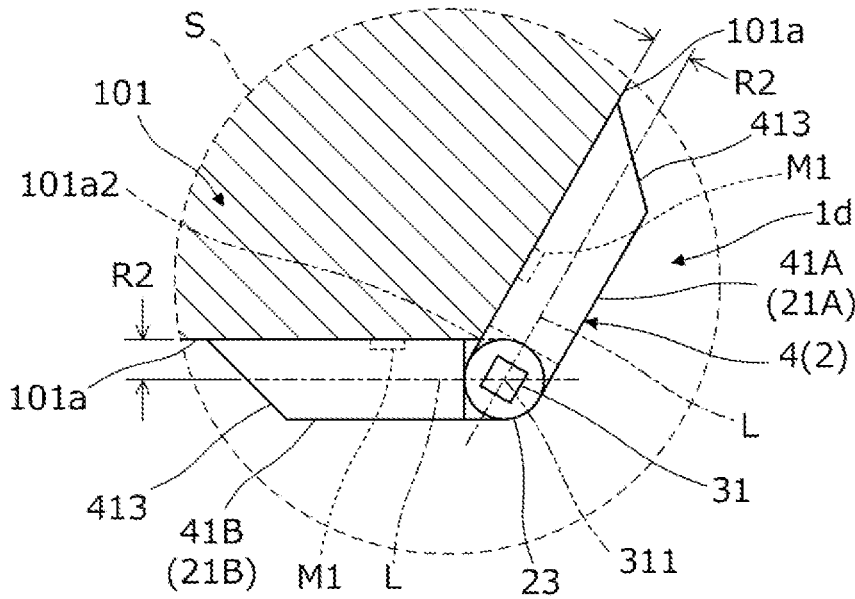

Next, a third embodiment of the present disclosure will be described. FIG. 18 is a perspective view of a target support tool 1d according to a third embodiment. In the target support tool 1d according to the third embodiment, the first and second arms 21A and 21B of the base member 2 described in the first and other embodiments connects to form various angles including a right angle with a hinge 23, which is a pivotable bent in place of the bent 22, which is provided in the first and the second embodiments. The first and second arms 21A and 21B are configured to pivot on the hinge 23, for example, within an angle range of 180° from +90° to −90°. For example, in an indoor space 103 in FIG. 18, the target support tool 1d can be used to measure the position of a corner formed by wall surfaces with any of various angles, including a recessed corner 101a1 or a projected corner 101a2, as an attachment target 101.

The retroreflector 31 of the target support tool 1d is placed at the pivot center of the hinge 23. An example measurement of the attachment target 101 using the target support tool 1d will be described: First, measure the positions of the retroreflectors 31 attached to three or more corners (e.g., the projected corner 101a2 in a section S and the recessed corners 101a1 adjacent to the projected corner 101a2 on both sides in the example in FIG. 18). Measured three points each at the three corners can be connected to draw two imaginary straight lines L, which are parallel to the outer surfaces 101a of the attachment target 101. The imaginary straight lines L will also form an angle with both sides of the inner measurement point (at the position 311 in an enlarged view of the section S). By measuring the angle between the imaginary straight lines L, an angle of the projected corner 101a2 can be determined. Since the angle of the projected corner 101a2 is equal to the sum of the angles of the first and second arms 21A and 21B, and a distance R2 between the imaginary straight lines L and the inner surface 412 is a known value, which is used as an offset between the projected corner 101a2 and the position of the retroreflector 31, then the position of the projected corner 101a2 can be calculated.

Note that the retroreflector 31 may be placed at a position with an offset in the direction of the pivot axis of the hinge 23 (which is the upward or backward direction with respect to the target support tool 1d) by a predetermined distance in order to allow easy positional checking performed with the surveying device 102. While the configurations described above so far are such that the target support tool 1d includes the first base body 4 alone, the target support tool 1d may include the first base body 4 and the second base body 5, 5a that are pivotable by the hinge 23.

Fourth Embodiment

Figure 19:
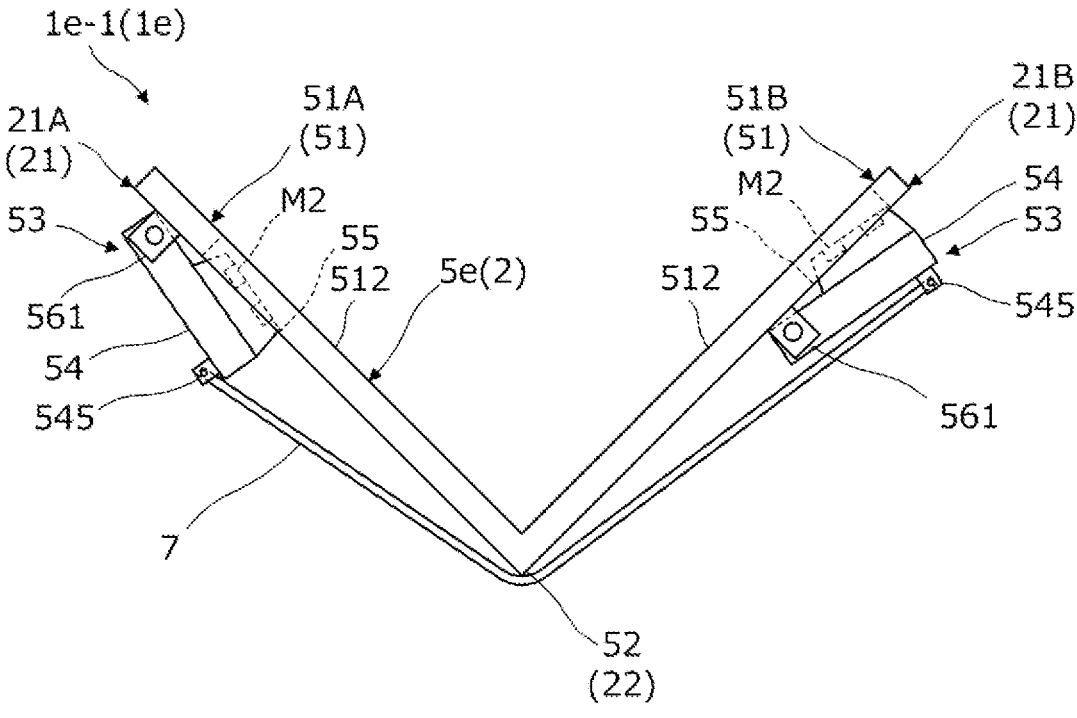
FIG. 19 is a schematic view showing a configuration of a target support tool according to a fourth embodiment.
Figure 19:
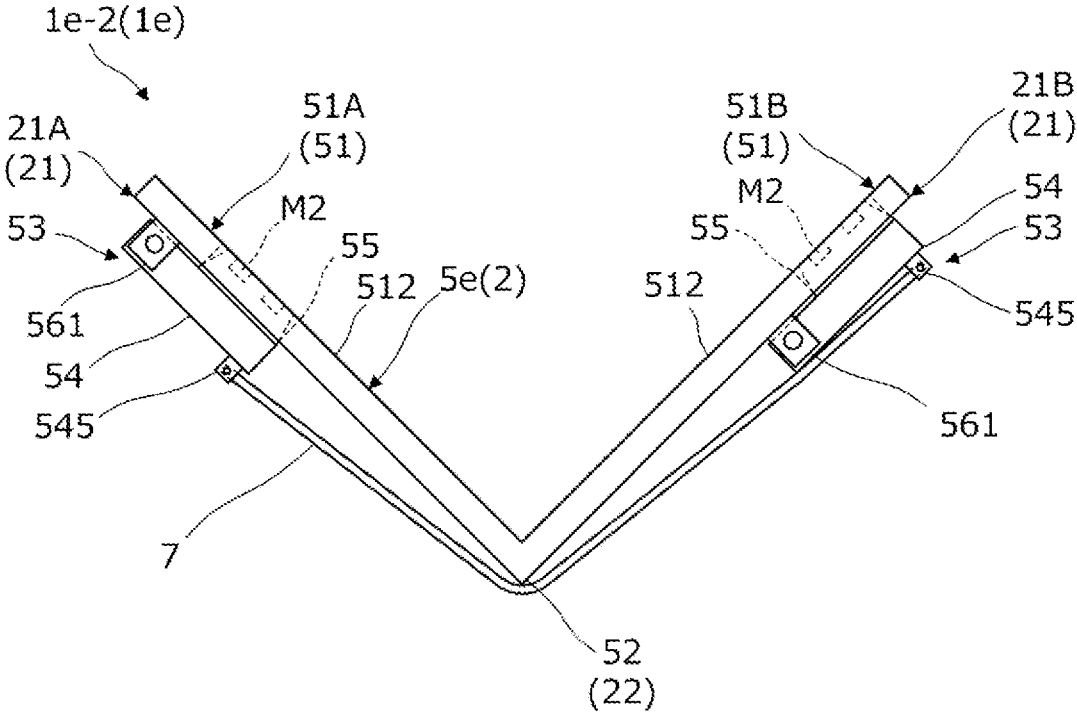

Next, a fourth embodiment of the present disclosure will be described. FIG. 19 is a schematic view showing a configuration of a target support tool 1e according to a fourth embodiment. In the description of the target support tool 1e, the same reference characters as those of the target support tool 1 are used to represent equivalent configurations, and the detailed explanation thereof will be omitted or simplified. FIG. 19 illustrates a configuration of a second base body 5e but no first base body 4.

In the target support tool 1 described above, each pivotable support part 561 supporting the corresponding magnet support part 54 proximal to the bent 52. In the target support tool 1e according to this embodiment, each pivotable support part 561 supporting the corresponding magnet support part 54 is located at one end (on the left in FIG. 19). Specifically, the pivotable support part 561 of one of the magnet support parts 54 corresponding to the first arm 51A is located distally from the bent 52, while the pivotable support part 561 of the other magnet support part 54 corresponding to the second arm 51B is located proximally to the bent 52.

The target support tool 1e includes a string link member 7 connecting the magnet support part 54 on the first arm 51A and the magnet support part 54 on the second arm 51B. The string link member 7 is a long flexible string article, such as a wire. The string link member 7 is connected to a connector 545 located at the pivotable end of each magnet support part 54. The string link member 7 passes through the outside corner (the projection) of the bent 52.

With the configuration of the target support tool 1e, for example, once the magnet support part 54 on the second arm 51B is operated in the closing direction, the string link member 7 operates the magnet support part 54 on the first arm 51A in the closing direction (i.e., the state of a target support tool 1e-1). Similarly, once the magnet support part 54 on the first arm 51A is operated in the opening direction, the string link member 7 operates the magnet support part 54 on the second arm 51B in the opening direction (i.e., the state of a target support tool 1e-2). In this manner, the target support tool 1e is configured such that the magnets M2 (i.e., the magnetic support part) on the first arm 51A and the magnets M2 (i.e., the magnetic support part) on the second arm 51B are attached and detached in coordination with each other.

If the pivotable support parts 561 are located at opposite sides of the magnet support parts 54, the coordinate operation in the opening or closing direction can be controlled reversely.

Each magnet support part 54 includes a releaser (e.g., the releaser 57) that causes the magnet support part 54 to pivot in the opening direction against the magnetic force of the magnets M2 (the details are not illustrated).

As described above, the target support tool 1e according to the fourth embodiment is also magnetically attached by causing the second base body 5e to abut on the attachment target 101 at a planned attachment point and then causing each magnet support part 54 to pivot. Using the target support tool 1e allows to perform, at different timings, the positioning by abutting on the attachment target 101 and the magnetically attaching to the attachment target 101, so that the retroreflector 31 can attach to the intended position precisely.

Fifth Embodiment

Figure 20:
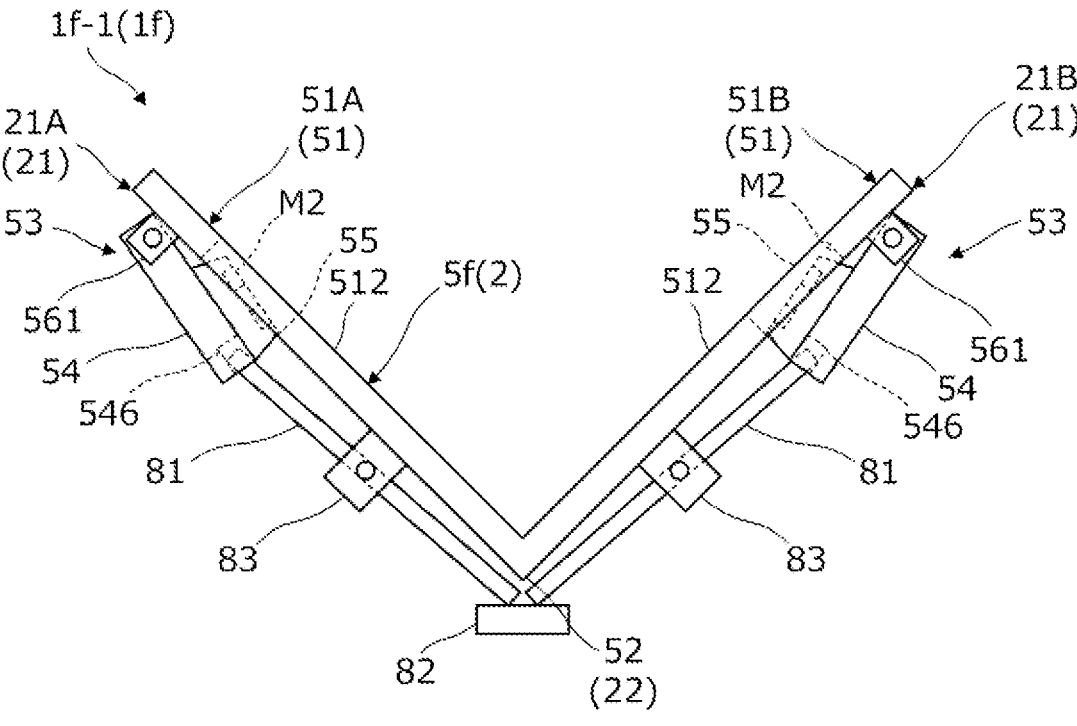
FIG. 20 is a schematic view showing a configuration of a target support tool according to a fifth embodiment.
Figure 20:
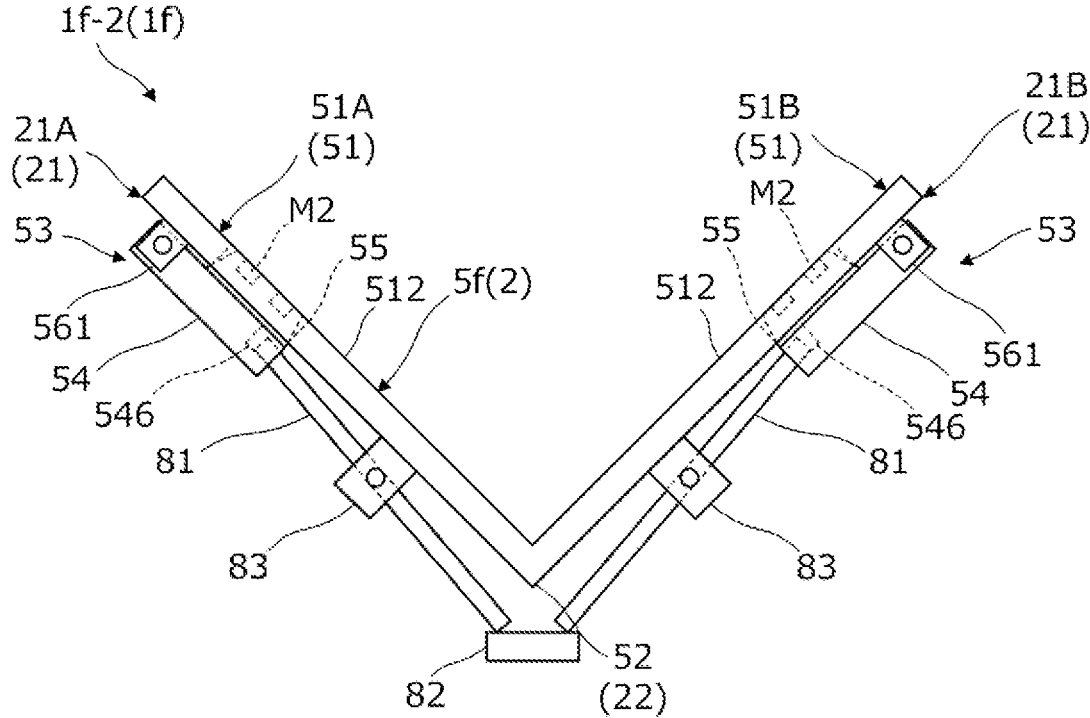

Next, a fifth embodiment of the present disclosure will be described. FIG. 20 is a schematic view showing a configuration of a target support tool if according to a fifth embodiment. In the description of the target support tool 1f, the same reference characters as those of the target support tool 1 are used to represent equivalent configurations, and the detailed explanation thereof will be omitted or simplified. FIG. 20 illustrates a configuration of a second base body 5*f* but no first base body 4.

The target support tool if includes link members 81 and an operatable part 82. Each link member 81 is in the shape of a long bar and is pivotably connected to one of the first arm 51A or the second arm 51B. The operatable part 82 can press and operate one end of the link member 81. The link member 81 is pivotably connected to and supported by a support part 83 on each of the first and second arms 51A and 51B of the second base body 5*f*. The operatable part 82 is located near the bent 52 and is movable in a direction toward and away from the second base body 5*f* by a guide (not illustrated). Note that the operatable part 82 according to this embodiment is biased in a direction away from the second base body 5*f* by a bias member (not illustrated) (e.g., a coil spring). The operatable part 82 is connected to (abuts on in the example in FIG. 20) one end (closer to the bent 52) of each link member 81 at a point closer to the second base body 5*f*.

The other end (i.e., distal from the bent 52) of the link member 81 is engaged with an engageable part (e.g., a groove or an inside corner) 546 of each magnet support part 54. The magnet support part 54 moves in the opening or closing direction in accordance with the position of the link member 81 engaged with the engageable part 546. Note that the detailed configuration of each engageable part 546 is not illustrated.

With the configuration of the target support tool 1*f*, for example, once the operatable part 82 is pressed toward the second base body 5*f*, one end of the link member 81 moves toward the bent 52 and the link member 81 pivots. The other end of the link member 81 then operates the corresponding magnet support part 54 in the opening direction (i.e., the state of a target support tool 1*f*-1). Once the pressing on the operatable part 82 is loosened, the biasing member biasing the operatable part 82 moves the operatable part 82 in the direction away from the second base body 5*f*. The pressing on the link member 81 is then loosened so that each magnet support part 54 is pivotable in the closing direction. When the second base body 5*f* abuts on the attachment target 101, each magnet support part 54 pivots in the closing direction by the magnetic force of the magnets M2 acting onto the attachment target 101 (i.e., the state of a target support tool 1*f*-2).

Note that the operatable part 82 described above may be able to operate one end of each link member 81 by pulling. The operatable part 82 and each link member 81 may be configured such that one end of the link member 81 moves in a direction away from the second base body 5*f* in accordance with the movement of the operatable part 82. The target support tool 1*f* may be configured such that each link member 81 and the operatable part 82, and the link member 81 and each magnet support part 54 are connected by hinges using bearings with long holes and shaft cores.

The present disclosure is not limited to the configurations that have been described above. The operatable part 82 may be biased toward the second base body 5*f* by a bias member (not illustrated). In this case, with no external force applied, each magnet support part 54 is moved in the opening direction by the corresponding link member 81 (i.e., the state of the target support tool 1*f*-1). By operating (pressing or pulling) the operatable part 82 in a direction away from the second base body 5*f*, the magnet support part 54 is operated in the closing direction toward the attachment target 101 (the state of the target support tool 1*f*-2).

Therefore, once the operatable part 82 moves each link member 81, the other end of the link member 81 then operates the corresponding magnet support part 54 in the opening or closing direction. This provides such an effect that the magnets M2 (i.e., the magnetic support part) on the first arm 51A and the magnets M2 (i.e., the magnetic support part) on the second arm 51B can be attached and detached in coordination with each other.

As described above, the target support tool if according to the fifth embodiment is also magnetically attached by causing the second base body 5*f* to abut on the attachment target 101 at a planned attachment point and then causing each magnet support part 54 to pivot. Using the target support tool if allows to perform, at different timings, the positioning by abutting on the attachment target (e.g., a steel frame) 101 and the magnetically attaching to the attachment target 101, so that the retroreflector 31 can attach to the intended position precisely.

Sixth Embodiment

Figure 21:
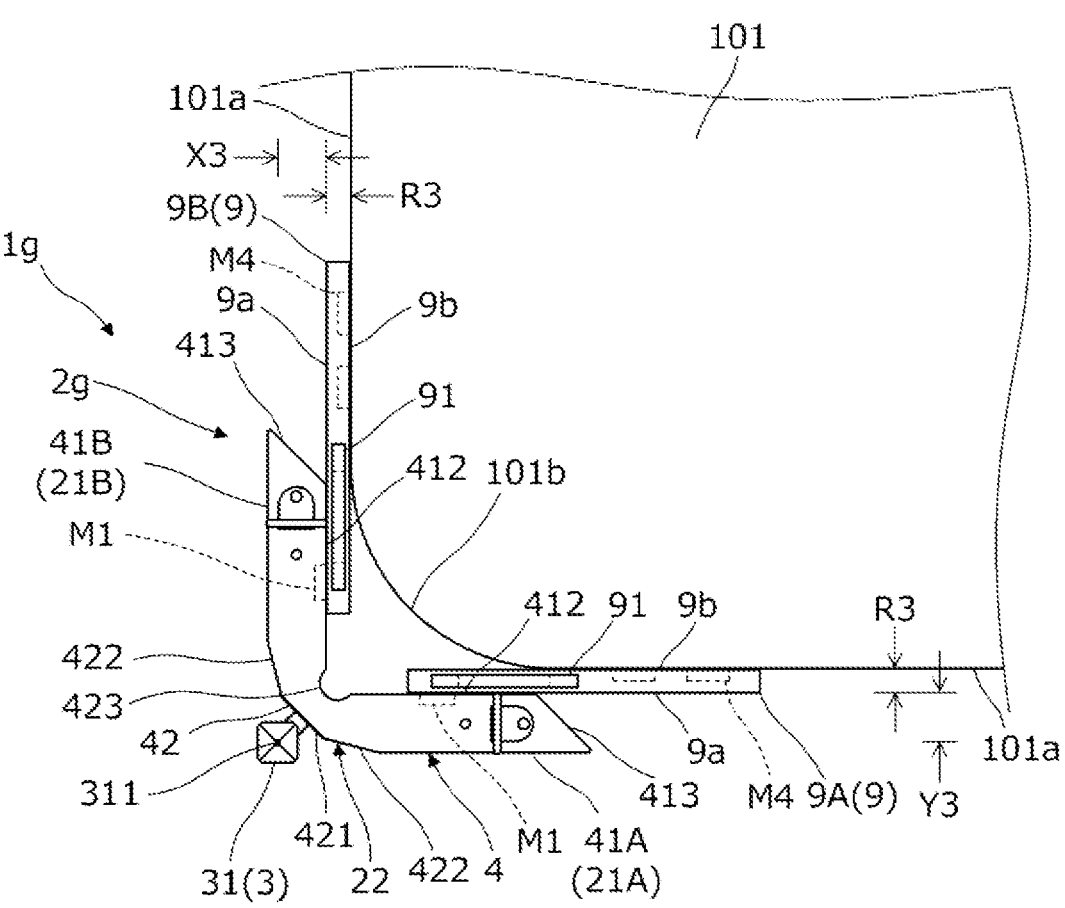
FIG. 21 illustrates an example use case of a target support tool according to a sixth embodiment.
Figure 22:
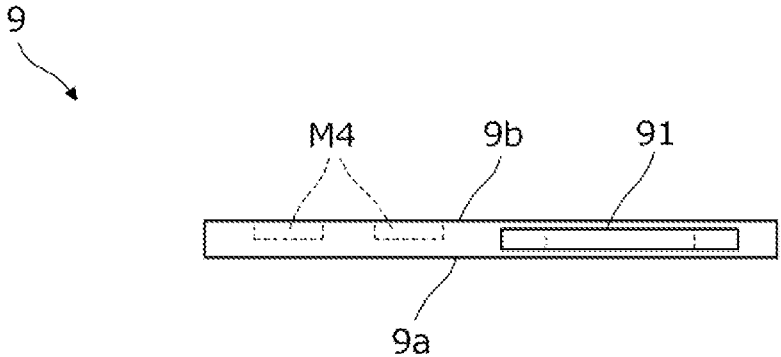
FIG. 22 illustrates an arm member of the target support tool according to the sixth embodiment.
Figure 22:
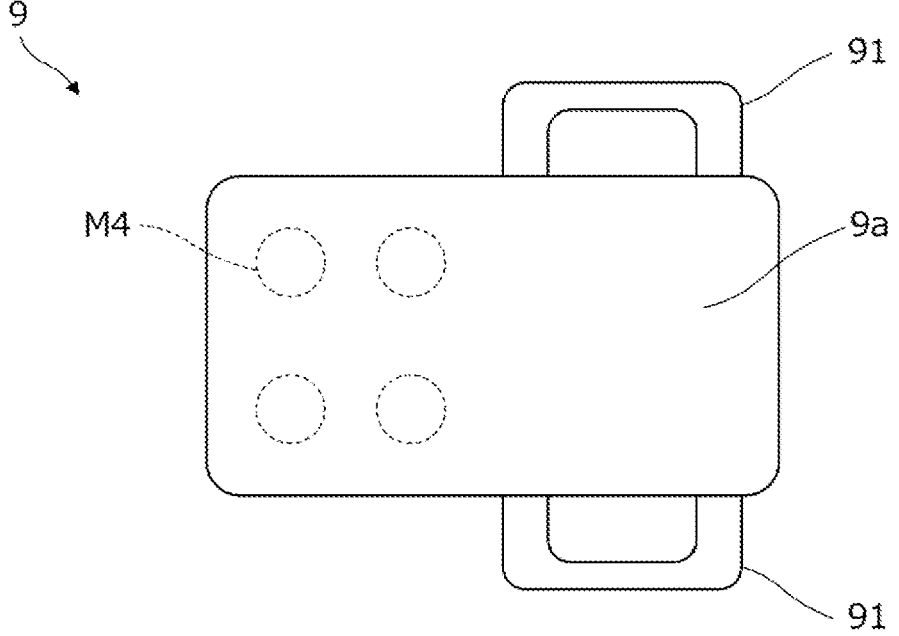

Next, a sixth embodiment of the present disclosure will be described. FIG. 21 illustrates an example use case of a target support tool 1*g* attached to the attachment target 101 using arm members 9. FIG. 22 illustrates the arm members 9 of the target support tool 1*g* according to the sixth embodiment. In the description of the target support tool 1*g*, the same reference numbers and characters as those of the target support tool 1 are used to represent equivalent configurations, and the detailed explanation thereof will be omitted or simplified.

The target support tool 1*g* includes the arm members 9 (i.e., a first arm member 9A and a second arm member 9B) instead of the second base body 5 according to the first embodiment. The arm members 9 are extension members (i.e., a third base body) that interpose between the first base body 4 and the attachment target 101, and attach the first base body 4 to the attachment target 101 in a fixed manner. That is, a base member 2*g* includes the first base body 4 and the arm members (i.e., the third base body) 9.

As illustrated in a plan view and a front view of FIG. 22, each arm member 9 is formed in the shape of a substantially rectangular flat surface, and includes a first flat surface 9*a* and a second flat surface 9*b* opposite to the first flat surface 9*a*. Each arm member 9 is made of a magnetic material. The first and second flat surfaces 9*a* and 9*b* are parallel to each other. The distance (thickness of the plate-like shape) R3 between the first and second flat surfaces 9*a* and 9*b* is given in advance and known. Each arm member 9 includes a plurality of magnets (a magnetic support part) M4 on the second flat surface 9*b*. Each arm member 9 includes an operatable part 91 substantially in a U-shape at each long side edge.

Referring back to FIG. 21, an example use case of the target support tool 1*g* using the arm members 9 will be described. First, the arm members 9 are attached to different adjacent outer surfaces 101*a* of the attachment target 101 by the magnetic force of the magnets M4, where each outer surface 101*a* faces the second flat surface 9*b* corresponding thereto. The arm members 9 are placed to form a substantially right angle. Accordingly, each outer surface 101*a* of the attachment target 101 will be extended by the corresponding first flat surface 9*a* at the corner 101*b*.

After that, the first base body 4 is attached to the first flat surface 9*a* of each arm member 9 by the magnetic force of the magnet M1 with the first flat surface 9a facing the corresponding inner surface 412. Accordingly, the arm member 9 located on the first arm 41A of the first base body 4 functions as the first arm member 9A that is the first arm, while the arm member 9 located on the second arm 41B of the first base body 4 functions as the second arm member 9B that is the second arm. The base member 2g includes the first and second arms 21A and 21B indirectly connected via the first base body 4 to form the bent 22 at which the retrore-flector 31 can be placed. In this regard, base member 2g is different from the base member 2 etc. including the first and second arms 21A and 21B integrally and directly connected by the second base body 5.

In this embodiment, a configuration has been described where the separate arm members 9 are used for the first and second arms 21A and 21B. With this configuration, even if one of the arm members 9 is leaningly attached to the corresponding outer surface 101a of the attachment target 101 at a tilt, the first flat surfaces 9a extend orthogonally to each other at the corner 101b without being influenced by the tilt. Depending on the curvature radius of the corner 101b of the attachment target 101, the first and second arms 41A and 41B of the first base body 4 can or cannot abut on sufficient areas of the outer surfaces 101a. Even in the case where the first and second arms 41A and 41B of the first base body 4 cannot abut on sufficient areas of the outer surfaces 101a due to a large curvature radius of the corner 101b, using the arm members 9 as extension members allows the target support tool 1g (i.e., the retroreflector 31) to be fixed at an intended position at the corner 101b with such a large curvature radius.

In this embodiment, since the base member 2g of the target support tool 1g includes the first base body 4 and the plurality of arm members 9, the target support tool 1g can be compact as a whole.

The position of the center O of the attachment target 101 can be calculated as follows. In FIG. 21, the retroreflector 31 of the target support tool 1g and the inner surface 412 of the second arm 41B (i.e., the first flat surface 9a) place at a distance X3 in-between in the first direction (i.e., the hori-zontal direction in FIG. 21), while a distance Y3 is between the retroreflector 31 and the outer surface 411 of the first arm 41A (i.e., the first flat surface 9a) in the second direction (i.e., the vertical direction in FIG. 21). The distances X3 and Y3 each are a design value, which has been given in advance and known. In addition, a distance R3 corresponds to the thickness of the plate-like shape of each arm member 9, between the first and second flat surfaces 9a and 9b. The distance R3 is also a design value, which is given and known. By utilizing these known design values, the position of the center O of the attachment target 101 can be deter-mined by measuring the position (i.e., in the spatial coor-dinates) 311 of the retroreflector 31 with the surveying device 102 (see FIG. 1), and offsetting the coordinate in the first direction is offset from the position 311 by the sum of the distances X1, R3, and X3 and offsetting the coordinate in the second direction is offset from the position 311 by the sum of the distances Y1, R3, and Y3.

Seventh Embodiment

Next, a target support tool according to a seventh embodi-ment will be described. The target support tool according to the seventh embodiment includes, instead of the magnets M1 to M4, electromagnets as magnetic support parts mag-netically attachable to the attachment target 101 in the first to six embodiments and the first to third variations. Some certain kinds of the electromagnets lose their magnetic force when powered on (when a current flows), and generate magnetic force when powered off When these kinds of the electromagnets are applied in place of the magnets M1 to M4, each member may include a power source such as a battery, a driver that controls the power supply to the electromagnets, and a receiver that receives a control instruction to the driver.

Accordingly, the electromagnets (i.e., the magnetic sup-port part) on the first arm 21A (41A, 51A, 51Aa) and the electromagnets (i.e., the magnetic support part) on the second arm 21B (41B, 51B, 51Ba) are electrically control-lable to be attached and detached in coordinate with each other.

When the electromagnets are used as the magnetic sup-port parts, the pivotable mechanism of the magnet support parts 54 can be excluded or omitted, which will simplify the configuration of the target support tool.

As described above, the target support tools 1 and 1a to 1g according to the present disclosure each include the base member 2 including the first and second arms 21A and 21B connectable to each other to form the bent 22 therebetween; the magnetic support part (i.e., the magnets M1 to M4 or the electromagnets) on at least the first arm 21A; and the retroreflector 31 at the bent 22 (or the hinge 23) of the base member 2. In addition, the configurations of the target support tools 1 and 1a to 1g have been described, each of which includes: the base member 2, 2a, 2g including the first and second arms 21A and 21B directly or indirectly con-nected to form the bent 22 at which the retroreflector 31 can be placed; and the magnetic support parts (i.e., the magnets M1 to M4 or electromagnets) on the first and second arms 21A and 21B. Accordingly, the retroreflector 31 is stably attachable to and detachable from any attachment target 101 using the magnetic support part(s). As a result, highly convenient target support tools 1 and 1a to 1d can be configured.

While the embodiments of the present disclosure have been described above as such, the aspects of the present disclosure are not limited to the embodiments.

For example, in the description of the embodiments, the distal ends 513 of the first and second arms 51A and 51B of the second base body 5 may bend to tilt the inner surfaces 512. As an alternative, the distal ends 513 each may form a flat surface on the distal end with area large enough to stably abut on the flat surfaces of the attachment target 101, as well as the distal ends 513 form flat on the same plane.

While the configurations described above so far are such that the first and second base bodies 4 and 5, 5a of the target support tools 1 and 1a according to the first and second embodiments are attachable and detachable, the first and second base bodies 4 and 5, 5a may be configured insepa-rably and integrally as a whole.

Each check mechanism 6 according to the first variation may have the following configuration: Once the target support tool 1 is attached to the attachment target 101, the main body 621 of the movable member 62 will project beyond the corresponding outer surface 511.

Once the target support tool 1 is detached from the attachment target 101, the movable member 62 will become substantially flush with the outer surface 511 or will enter and go into the housing 61.

Each check mechanism 6 may include an electrical mechanism to detect the attachment target 101 attaching the target support tools 1 and 1a to 1d, and then perform notification electrically, such as light turning-on or illumi-nation and slight electric shocks. In this case, the target support tools 1 and 1*a* to 1*d* may include a power source (e.g., a battery or a solar panel).

While the configurations described above in the embodiments so far are such that the magnets M1 to M3 are placed on each of the first and second arms 21A and 21B, the magnets M1 to M3 may be on at least either one of the first or second arms 21A or 21B. In this sense, the one with the magnets M1 to M3 may be defined as the first arm 21A.

While the first and second arms 21A and 21B have been described in different names for the sake of convenience, the configurations and names may be exchangeable between the first and second arms 21A and 21B in each of the target support tools 1 and 1*a* to 1*d*.

While the configuration examples described above so far are such that the first and second arms 21A and 21B are the linear bars, each arm may partially or fully include a curve. That is, the first and second arms 21A and 21B each may form in other shapes, which are suitable to be attachable in accordance with the corresponding outer surface 101*a* of the attachment target 101. For example, if the outer surfaces 101*a* of the attachment target 101 curve like the side surface of a cylindrical columnar body, the inner surfaces of the first and second arms 21A and 21B each may include a curved arc region.

In each of the target support tools 1 and 1*a*, 1*b*, 1*c*, 1*e*, 1*f*, and 1*g*, the retroreflector 31 may include the position 311, which is the measurement point, at the intersection between the center lines (i.e., the imaginary straight lines L) of the first and second arms 21A and 21B as illustrated in the target support tool 1*d* in FIG. 18.

While the configurations described so far in the embodiments are such that the first and second base bodies 4 and 5, 5*a* are attachable and detachable by the magnets M1, each base body may be attachable and detachable by other attachment and detachment mechanisms, such as screw fastening, recess-and-protrusion mating, or an engagement and disengagement mechanism using engagement claws.

The configurations according to the first to seventh embodiments and the first to third variations are modifiable by replacing a part of their configurations with another one from the other embodiment or variations or adding a part of a configuration of the other embodiment or variations.

What is claimed is:

1. A target support tool, comprising:
   a base member including a first arm and a second arm connectable to each other to form a bent therebetween and allowing a measurement target to be placed at the bent;

a magnetic support part at least on the first arm, the magnetic support part allowing attachment and detachment of the measurement target a retroreflector to an attachment target; and,
   wherein
   at least the first arm includes:
   the magnet support part on one surface of the first arm;
   a hole having a shape in conformity of a shape of the magnet support part; and
   a pivotable support part configured to pivotably support the magnet support part with one surface of the magnet support part exposed through the hole.

2. The target support tool of claim 1, wherein the first arm and the second arm are connectable to form an angle at the bent.

3. The target support tool of claim 1, wherein
   a distal end surface of the first arm and a distal end surface of the second arm form a same plane.

4. The target support tool of claim 1, wherein
   the measurement target is placed at an outside corner of the bent.

5. The target support tool of claim 1, wherein
   the magnetic support part is located at least on each of inner surfaces of the first arm and the second arm, the inner surfaces being on an internal corner side of the bent.

6. The target support tool of claim 1, wherein
   the magnet support part includes, along an edge thereof located in a radial direction of a pivot of the pivotable support part, a taper configured to guide insertion into and extraction from the hole.

7. The target support tool of claim 1, wherein
   at least the first arm further includes a releaser configured to move the magnetic support part in a direction away from the hole.

8. The target support tool of claim 7, wherein
   the releaser includes: a fulcrum part supported pivotally with respect to the magnet support part; an effort part on one side of the fulcrum part; and a load part on another side of the fulcrum part, the load part being capable of pressing an opening edge of the hole.

9. The target support tool of claim 1, wherein
   the base member includes a first base body including the measurement target and a second base body including the magnetic support part.

10. The target support tool of claim 2, wherein the angle is a right angle.

* * * * *